US005659740A

United States Patent [19]

Ezaki et al.

[11] Patent Number: 5,659,740

[45] Date of Patent: Aug. 19, 1997

[54] INFORMATION SERVICE SYSTEM USING UNITY CODE

[75] Inventors: Hitoshi Ezaki, Yokohama; Hitoshi Kawada, Tokyo; Akira Oosawa; Naoshi Honma, both of Yokohama, all of Japan

[73] Assignee: Olympus Optical Co., Ltd., Tokyo, Japan

[21] Appl. No.: 56,492

[22] Filed: Apr. 30, 1993

[30] Foreign Application Priority Data

Apr. 30, 1992 [JP] Japan .................................... 4-110591
Mar. 9, 1993 [JP] Japan .................................... 5-048246

[51] Int. Cl.[6] ............................ G06F 17/30; G06F 11/00

[52] U.S. Cl. .......................... 395/614; 395/601; 395/604; 395/605; 395/606; 395/202; 395/203; 395/216; 235/375; 377/88

[58] Field of Search ............................... 235/375; 379/88; 364/468, 401, 408; 395/600

[56] References Cited

U.S. PATENT DOCUMENTS

| | | | |
|---|---|---|---|
| 4,491,725 | 1/1985 | Pritchard | 235/375 |
| 5,220,501 | 6/1993 | Lawlor et al. | 364/408 |
| 5,222,120 | 6/1993 | McLeod et al. | 379/88 |
| 5,305,196 | 4/1994 | Deaton et al. | 364/401 |
| 5,311,438 | 5/1994 | Sellers et al. | 364/468 |
| 5,339,239 | 8/1994 | Manabe et al. | 364/401 |

FOREIGN PATENT DOCUMENTS 4-108133 4/1992 Japan .

OTHER PUBLICATIONS

OEP. Office Equipment and Products, vol. 20, No. 156, Sep. 1991, Japan, pp. 44–45, "In Full Swing, JIFCS Operations Enhance Market Efficiency".

OEP. Office Equipment and Products, vol. 20, No. 156, Sep. 1991, Japan, p. 47, "Apparel Business Sews Up New Information System".

Modern Materials Handling, vol. 44, No. 8, Jul. 1989, U.S. pp. 77–78 G. Forger "Slashing Lead Times With Quick Response".

Japan Computer Quarterly, No. 83, 1990, Japan, pp. 3–15 K. Asano "Japan's Distribution System Information Network".

*Primary Examiner*—Thomas G. Black
*Assistant Examiner*—Cheryl Lewis
*Attorney, Agent, or Firm*—Frishauf, Holtz, Goodman, Langer & Chick

[57] ABSTRACT

This system is applied to a VAS having, as members, apparel makers which manage goods using apparel numbers and retail shops which manage goods using shop goods codes. The system tally manages the goods of all the members using unity codes. The apparel numbers are corrected as needed, and the corrected apparel numbers are incorporated in a unity code system. A code conversion table representing a correspondence between the unity code and the apparel number or the shop goods code is prepared. When this code conversion table is looked up, a management code is converted between the apparel number, the shop goods code, and the unity code, all of which represent the same goods.

28 Claims, 31 Drawing Sheets

| UNITY CODE | APPAREL ID | APPAREL GOODS CODE |
|---|---|---|
| ID AND CODE | | |
| | | |
| | | |
| | | |

F I G. 4A

| UNITY CODE | SHOP(USER) ID | SHOP GOODS CODE |
|---|---|---|
| ID AND CODE | | |
| | | |
| | | |
| | | |

F I G. 4B

| UNITY CODE | TEXTILE CODE |
|---|---|
| ID AND CODE | |
| | |
| | |
| | |

F I G. 4D

| APPAREL GOODS CODE | SHOP(USER) ID | SHOP GOODS CODE |
|---|---|---|
| | | |
| | | |
| | | |
| | | |

F I G. 4C

| UNITY CODE | APPAREL MAKER NAME (ID) | LIST PRICE | TEXTILE CODE | |
|---|---|---|---|---|
| ID AND CODE | | | | |
| | | | | |
| | | | | |
| | | | | |

F I G. 4E

| UNITY CODE | NAME OF APPAREL MAKER | NAME OF APPAREL GOODS | OFFERED LIST PRICE | AMOUNT OF SOLD | SALES VOLUME | |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

| ITEM FOR SEARCHING | KEY WORD FOR SEARCHING | |
|---|---|---|
| | NAME | CODE |
| APPAREL MAKER | | |
| CLASSIFICATION OF GOODS (CLOTHES) | | |
| BRAND | | |
| TEXTILE USED | | |
| OFFERED PRICE RANGE | | |
| SIZE | | |
| KIND OF CLOTHES | | |
| WEIGHT | | |
| FEELING | | |
| QUALITY INFO | | |
| ⋮ | | |
| SILHOUETTE (PATTERN RECOGNITION) | | |

FIG. 16

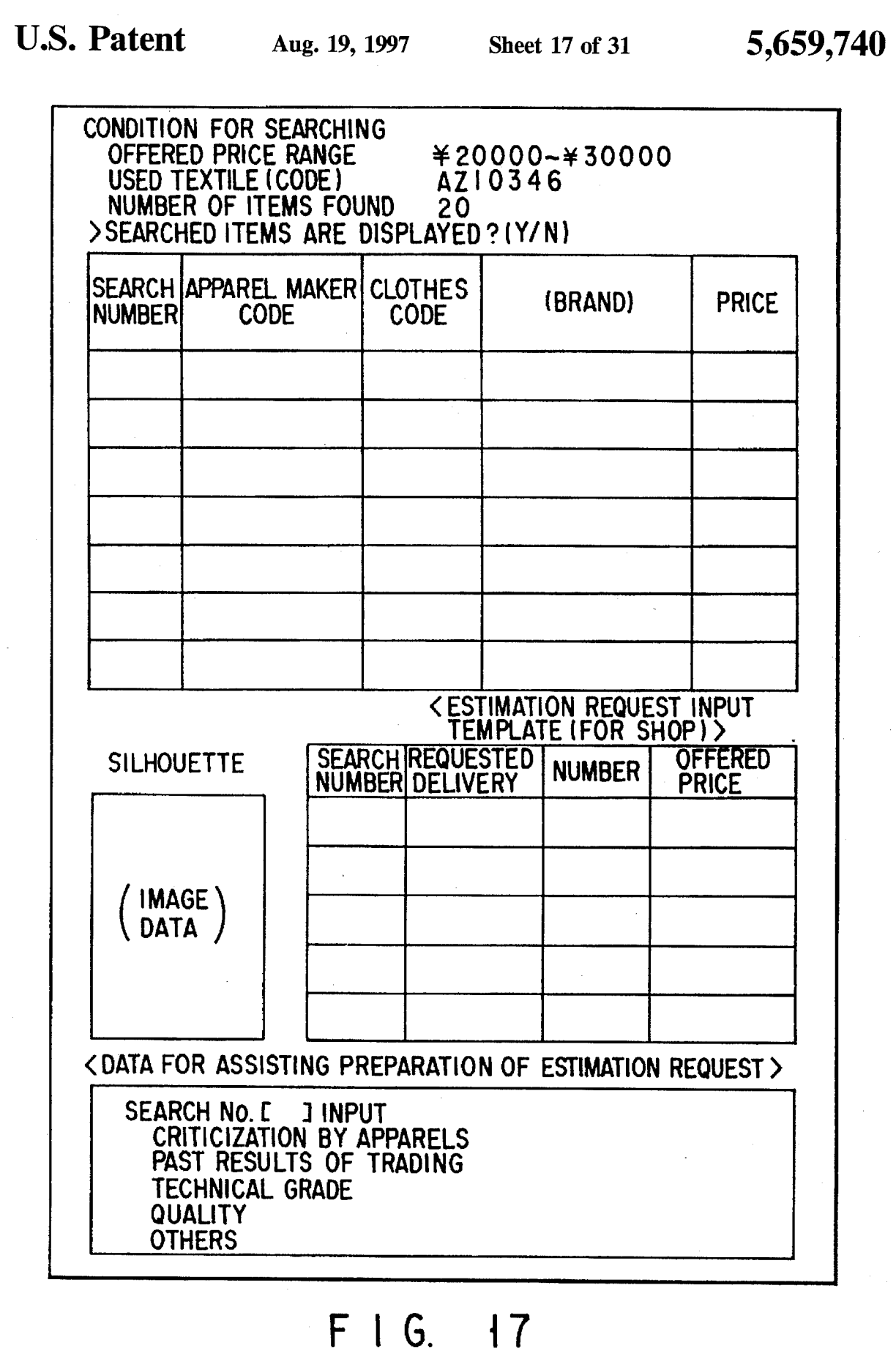

CONDITION FOR SEARCHING
OFFERED PRICE RANGE ¥20000~¥30000
USED TEXTILE (CODE) AZ10346
NUMBER OF ITEMS FOUND 20
>SEARCHED ITEMS ARE DISPLAYED? (Y/N)

| SEARCH NUMBER | APPAREL MAKER CODE | CLOTHES CODE | (BRAND) | PRICE |
|---|---|---|---|---|
| | | | | |
| | | | | |
| | | | | |
| | | | | |
| | | | | |
| | | | | |
| | | | | |

<ESTIMATION REQUEST INPUT TEMPLATE (FOR SHOP)>

SILHOUETTE (IMAGE DATA)

| SEARCH NUMBER | REQUESTED DELIVERY | NUMBER | OFFERED PRICE |
|---|---|---|---|
| | | | |
| | | | |
| | | | |
| | | | |
| | | | |

<DATA FOR ASSISTING PREPARATION OF ESTIMATION REQUEST>

SEARCH No. [ ] INPUT
CRITICIZATION BY APPARELS
PAST RESULTS OF TRADING
TECHNICAL GRADE
QUALITY
OTHERS

FIG. 17

<DISPLAYED APPEARANCES OF DATA OF ACCEPTED ORDERS>

| CLOTHES CODE (UNITY CODE) | CLOTHES NAME | DATE OF DELIVERY | PRICE | AMOUNT | SIZE | SHOP NAME | |
|---|---|---|---|---|---|---|---|
| | | | | | | | |
| | | | | | | | |
| | | | | | | | |
| | | | | | | | |
| | | | | | | | |
| | | | | | | | |
| | | | | | | | |

FIG. 20

CLASSIFICATION OF GOODS; BLOUSE

FIG.22A

| | |
|---|---|
| APPAREL CODE | ID = A001 |
| APPAREL No. | No.10301 |
| COLOR VARI. | BLUE & WHITE |
| SIZE VARI. | No.9 |
| OTHER INFO. | BUTTON ATTACHED OR NOT |

FIG.22B

| | | | | |
|---|---|---|---|---|
| UNITY CODE | A00124 305001 | A00124 305002 | A00124 305003 | A00124 305004 |
| APPAREL CODE | A001 | A001 | A001 | A001 |
| APPAREL No. | 10301 | 10301 | 10301 | 10301 |
| VAS SERI. No. | 001 | 002 | 003 | 004 |
| COLOR VARI. | BLUE | WHITE | BLUE | WHITE |
| SIZE VARI. | No.9 | No.9 | No.9 | No.9 |
| OTHER INFO. | NO BUTTON | NO BUTTON | BUTTON ATTCHED | BUTTON ATTCHED |

FIG.22C

| | | | | | |
|---|---|---|---|---|---|
| SHOP CODE | K010 | K010 | K010 | K010 | |
| UNITY CODE | A00124 305001 | A00124 305002 | A00124 305003 | A00124 305004 | |
| APPAREL CODE | A001 | A001 | A001 | A001 | |
| APPAREL No. | 10301 | 10301 | 10301 | 10301 | |
| VAS SERI. No. | 001 | 002 | 003 | 004 | |
| SHOP GOODS CODE | 43151 | 43152 | 43153 | 43154 | 43154S |
| COLOR VARI. | BLUE | WHITE | BLUE | WHITE | WHITE |
| SIZE VARI. | No.9 | No.9 | No.9 | No.9 | No.9 |
| OTHER INFO. | NO BUTTON | NO BUTTON | BUTTON ATTCHED | BUTTON ATTCHED | SPECIAL BUTTON |

CLASSIFICATION OF GOODS; COAT

FIG.23A

| | |
|---|---|
| APPAREL CODE | ID= A002 |
| APPAREL No. | No. 13579 |
| COLOR VARI. | BLACK & WHITE |
| SIZE VARI. | No.8 & No.9 |
| OTHER INFO. | NATURAL(WILD) OR ARTIFICIAL |

FIG.23B

| | | | | | |
|---|---|---|---|---|---|
| UNITY CODE | A00224 680001 | A00224 680002 | A00224 680003 | A00224 680004 | A00224 680005 |
| APPAREL CODE | A002 | A002 | A002 | A002 | A002 |
| APPAREL No. | 13579 | 13579 | 13579 | 13579 | 13579 |
| VAS SERI. No. | 001 | 002 | 003 | 004 | 005 |
| COLOR VARI. | BLACK | BLACK | WHITE | WHITE | WHITE |
| SIZE VARI. | No.8 | No.9 | No.8 | No.9 | No.8 |
| OTHER INFO. | ARTIF. | ARTIF. | ARTIF. | ARTIF. | NATUR. |

FIG.23C

| | | | | | |
|---|---|---|---|---|---|
| SHOP CODE | K100 | K100 | K100 | K100 | K100 |
| UNITY CODE | A00224 680001 | A00224 680002 | A00224 680003 | A00224 680004 | A00224 680005 |
| APPAREL CODE | A002 | A002 | A002 | A002 | A002 |
| APPAREL No. | 13579 | 13579 | 13579 | 13579 | 13579 |
| VAS SERI. No. | 001 | 002 | 003 | 004 | 005 |
| SHOP GOODS CODE | 029 | | | | 129 |
| COLOR VARI. | FREE | FREE | FREE | FREE | FREE |
| SIZE VARI. | FREE | FREE | FREE | FREE | FREE |
| OTHER INFO. | ARTIF. | ARTIF. | ARTIF. | ARTIF. | NATUR. |

CLASSIFICATION OF GOODS; DRESS

FIG.24A

| | |
|---|---|
| APPAREL CODE | ID = A003 |
| APPAREL No. | No. 84625 |
| COLOR VARI. | WHITE. |
| SIZE VARI. | No.7 & No.8 |
| OTHER INFO. | BRAND 1 OR BRAND 2 |

FIG.24B

| | | | | |
|---|---|---|---|---|
| UNITY CODE | A00342 312001 | A00342 312002 | A00342 312003 | A00342 312004 |
| APPAREL CODE | A003 | A003 | A003 | A003 |
| APPAREL No. | 84625 | 84625 | 84625 | 84625 |
| VAS SERI. No. | 001 | 002 | 003 | 004 |
| COLOR VARI. | WHITE | WHITE | WHITE | WHITE |
| SIZE VARI | No.7 | No. 8 | No.7 | No.8 |
| OTHER INFO. | BRAND 1 | BRAND 1 | BRAND 2 | BRAND 2 |

FIG.24C

| | | | | |
|---|---|---|---|---|
| SHOP CODE | K321 | K321 | K321 | K321 |
| UNITY CODE | A00342 312001 | A00342 312002 | A00342 312003 | A00342 312004 |
| APPAREL CODE | A003 | A003 | A003 | A003 |
| APPAREL No. | 84625 | 84625 | 84625 | 84625 |
| VAS SERI. No. | 001 | 002 | 003 | 004 |
| SHOP GOODS CODE | DW171 | DW181 | DW271 | DW281 |
| COLOR VARI. | WHITE | WHITE | WHITE | WHITE |
| SIZE VARI. | No. 7 | No. 8 | No.7 | No.8 |
| OTHER INFO. | BRAND 1 | BRAND 1 | BRAND 2 | BRAND 2 |

FIG.25A

| CLASSIFICATION OF GOODS | BLOUSE | BLOUSE | BLOUSE |
|---|---|---|---|
| UNITY CODE | xxx24305xxx | xxx24305xxx | xxx24305xxx |
| APPAREL ID | A001 | A001 | A001 |
| APPAREL No. | 10301 | 10301 | 10301 |
| VAS SERI. No. | 001 | 001 | 002 |
| SHOP ID | K010 | K020 | K010 |
| SHOP GOODS CODE | 43151 | B039 | 43152 |

FIG.25B

| CLASSIFICATION OF GOODS | COAT | COAT | COAT |
|---|---|---|---|
| UNITY CODE | xxx24608xxx | xxx24608 xxx | xxx24608 xxx |
| APPAREL ID | A002 | A002 | A002 |
| APPAREL No. | 13579 | 13579 | 13579 |
| VAS SERI. No. | 001 | 003 | 003 |
| SHOP ID | K100 | K100 | K200 |
| SHOP GOODS CODE | 029 | 029 | C040 |

FIG.25C

| CLASSIFICATION OF GOODS | DRESS | DRESS | DRESS |
|---|---|---|---|
| UNITY CODE | xxx42312 xxx | xxx 42312xxx | xxx 42312 xxx |
| APPAREL ID | A003 | A011 | A022 |
| APPAREL No. | 84625 | D333 | 951 |
| VAS SERI. No. | 003 | 001 | 002 |
| SHOP ID | K321 | K456 | K987 |
| SHOP GOODS CODE | DW271 | S741 | P963 |

INFORMATION SERVICE SYSTEM USING UNITY CODE

BACKGROUND OF THE INVENTION

1. Field of the Invention

The present invention relates to an information service system for mainly an apparel business world (clothing industry). The present invention also relates to a code conversion system for cancelling differences in codes used by different members in an information service for unlimited members and, more particularly, to a code conversion system capable of correcting a difference in management level even if the management levels (information classification method/number of classification levels) of members are different from one another, and for performing information processing of all the members in an integration management level.

2. Description of the Related Art

An apparel VAN (value-added network) for an apparel business world is proposed as a service network for circulated information, wherein a combination of POS (point of sales), VAN, CAD/CAM (computer-aided design/computer-aided manufacturing), and FA (factory automation) is defined as a total network.

This apparel VAN is established within a single enterprise, but cannot cope with the entire apparel business world. That is, the apparel business world in a broad sense is constituted by a plurality of individual enterprises, and the individual enterprises use their own original goods codes to configure systems for improving business efficiency. The goods codes of the respective enterprises are independent of each other. Therefore, in the systems of different enterprises, the identical goods are possibly recognized as different goods. Thus, each system properly functions within the corresponding enterprise (or its affiliation group), and only the data within each enterprise can be gathered and processed.

The apparel business world is mainly constituted by four groups, i.e., a selling network (retail shops and boutiques), apparel makers, sewing companies, and material concerns (a textile concern, thread/fabric manufacturers, and concerns and manufacturers for sub-materials such as lining, buttons, and fasteners).

Each of the four groups is constituted by a plurality of competitive enterprises (the enterprises range from a personal one to a limited company). Design senses, perceptual recognition degrees, (e.g., color tone, feeling, and texture), manufacturing techniques (skills of sewers), good seller prediction capacities (intuition based on various data), and others of goods to be handled in each group vary depending on the individual enterprises (or persons) in practice. For this reason, even if a given goods (e.g., a green one-piece dress) is an object to be traded, consensus in recognition between the enterprises or persons for even a color tone cannot be established in the absence of an actual dress (goods sample). (The same color may often be perceived as green or blue.)

In the apparel business world as a group of enterprises, companies, and individual persons having different standards of recognition and perception, it is very difficult to form a common database. In fact, such a database is not yet proposed.

To prepare a large common database in the apparel business world, a large quantity of capital and talented persons, and cumbersome operations are required, and at the same time the failure of management is always involved in the preparation of such a database. The preparation of the common database in the apparel business world cannot be achieved by individuals or a small, single enterprise (i.e., a large number of retail shops, an apparel maker, and a sewing company).

An enterprise and an individual that cannot utilize such a database must perform predetermined order proceedings of several future good sellers (clothes) in a prospective sales volume on the basis of the available information and its (his) own intuition until a season in which the stocked clothes can be sold.

Assume that an apparel maker plans to sell quality female dresses in this summer. In this case, this apparel maker roughly predicts the number of dresses which will be ordered by quality boutiques and the number of quality boutiques and reserves to make an order to a predetermined textile concern and a predetermined sewing company so as to stock a predetermined sales volume of female dresses Until the date of sale.

When the reservation of this order according to the conventional business practice is not made a given period before the date of sale (6 to 18 months before the date of sale; this period is called a lead time), the stock cannot be assured in a required quantity within the best selling period (a maximum of 2 to 3 months) of the clothes. The reservation amount is roughly determined. When this rough reservation amount almost coincides with the actual amount of sold, no problem is posed. However, this is not always the case according to the empirical rule. When a large number of clothes are left unsold after the best selling season, they are returned to the apparel maker to depress the management. To the contrary, if the planned dress is a good seller better than expected, and a shortage of the goods occurs, the goods (clothes) cannot be supplied to the consumers within the best selling season, resulting in inconvenience (any summer best seller cannot be sold at the start of the fall).

Note that ready-made goods such as formal dresses and low-end popular goods have a longer lead time than that of female dresses which soon lose popularity.

The apparel VAN does not have the database common to the apparel business world and cannot offer a good information service corresponding to the internal situations of the retail shops, apparel makers, sewing companies, and material concerns, which have a give-and-take relationship.

SUMMARY OF THE INVENTION

It is accordingly a first object of the present invention to provide an information service system in which a common database of an entire apparel business world united by a unity code is prepared from information originally used by the respective enterprises and individual persons serving as system members (users or subscribers) of the information service system, nonconfidential information of the common data base is available to all the members to offer a good information service corresponding to the individual internal situations of independent retail shops, an apparel maker, a sewing company, and material concerns.

It is a second object of the present invention to provide a system for performing code conversion to absorb or cancel a difference in code systems between each member and the system in such a manner that each member of the information service system, having an original unity code system, can access the information service system with a member's original code or a unity code of the original unity code system in order to manage the goods of the member, and the information service system can gather, analyze, and arrange information of all the members using the unity codes.

An information service system according to the first invention comprises: a database for storing goods information from a given system member (e.g., apparel "A") together with a unity code (apparel ID+apparel goods code) corresponding to a code (apparel goods code) used for the goods information by the given member; means for linking a code (shop goods code), used by another system member (e.g., shop "K") for an equivalent goods represented by the goods information, to the unity code of the equivalent goods; means for accessing the database using the unity code in response to a request of the system member except that the given or another system member requests the goods information in the database using their original code.

Each member can access the database including his own member original information and information of a third party.

A code conversion system according to the second invention is applied to an information service system which has at least one member (apparel maker or retail shop) who manages information or goods using an original code system. The information service system performs systematic management (or supervision) of information or goods handled by the member using a predetermined code system.

To manage information or goods, managed by the member, in the information service system, the member code (e.g., an apparel number) is appropriately modified (change in management level) and is used as the unity code in the predetermined code system in the information service system. In this case, code conversion information representing a correspondence between the unity code and the member code for the same information or goods is prepared.

By referring to the code conversion information, a management code associated with the same information or goods is converted between the member code and the unity code.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4E are views showing code masters for goods included in the apparel DB in FIG. 2;

FIG. 16 is a view showing a template of searching goods data from a retail shop;

FIG. 17 is a view showing a template for displaying a search result at a retail shop and an input template for an estimation request;

FIG. 20 is a view showing a template of displaying data of orders accepted by an apparel maker in response to the data of the order input in the template of FIG. 19;

FIGS. 22A to 22C are views showing code formats when the management level of the unity code is higher than that of the goods classification code of the apparel maker and the management level of the shop goods code is higher than that of the unity code;

FIGS. 23A to 23C are views showing code formats when the management level of the unity code is higher than the goods classification code of the apparel maker and the management level of the shop goods code is lower than that of the unity code;

FIGS. 24A to 24C are views showing code formats when the management level of the unity code is higher than that of the goods classification code of the apparel maker and the management level of the shop goods code is equal to that of the unity code;

FIGS. 25A to 25C are code conversion tables according to the present invention;

DETAILED DESCRIPTION OF THE PREFERRED EMBODIMENTS

Figure 1:
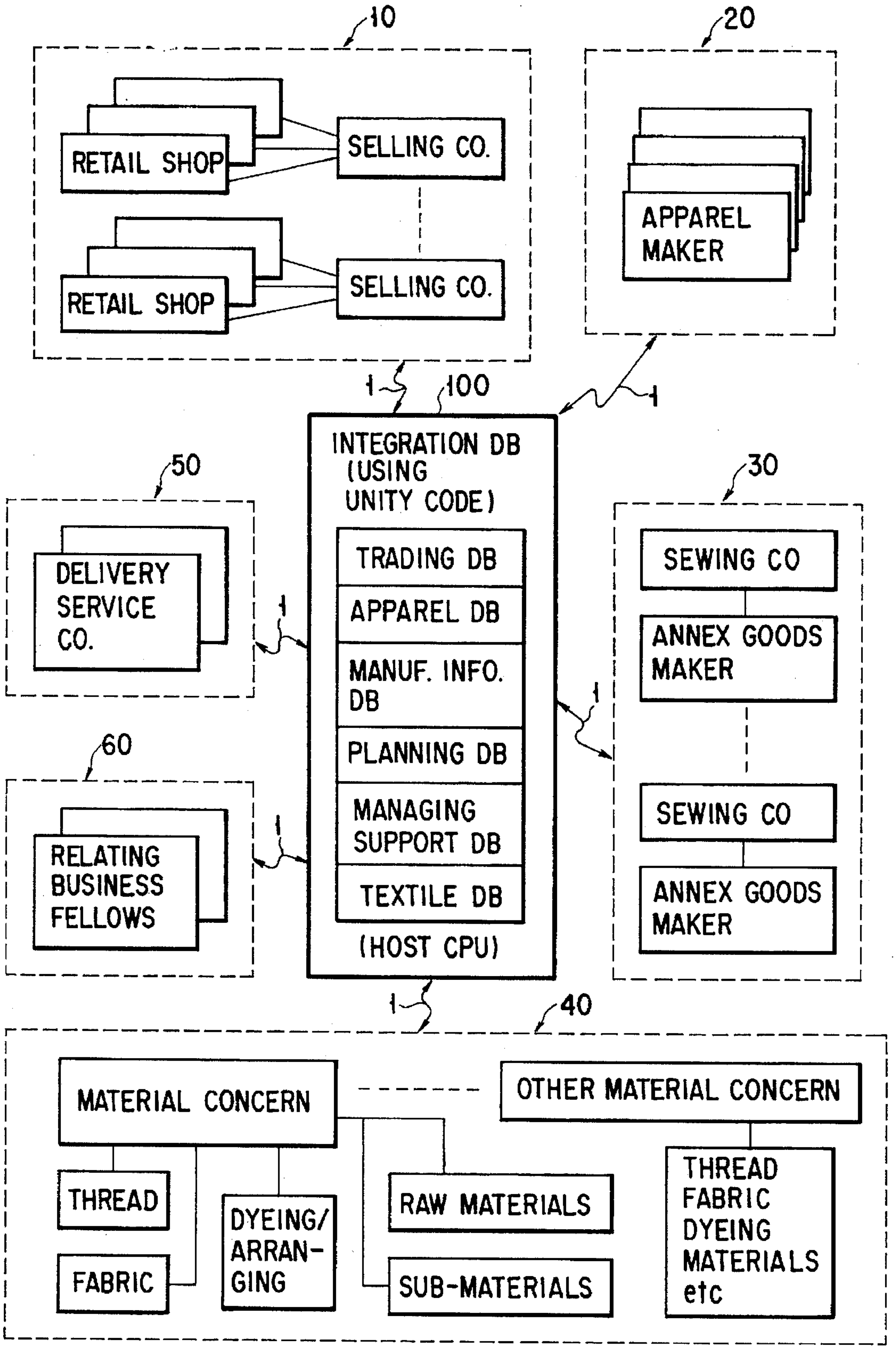
FIG. 1 is a diagram showing an overall arrangement of an information service system according to an embodiment of the present invention.

FIG. 1 shows an overall arrangement when an information service system according to an embodiment of the first invention is applied.

Referring to FIG. 1, integration database (DB) 100 is connected to apparel makers 20, sewing companies 30, material concerns 40, delivery service companies 50, and relating business fellows 60. Apparel makers 20, sewing companies 30, material concerns 40, delivery service companies 50, and relating business fellows 60 (or apparel makers 20, sewing companies 30, and material concerns 40) serve as members for a company which offers information services using database 100. That is, database 100 serves as a database common to members 10 to 60.

Selling companies 10 constitute a group of a plurality of independent selling companies and a plurality of independent retail shops (e.g., boutiques). Selling companies 10 run business using independent shop goods codes.

Apparel makers 20 constitute a group of a plurality of independent apparel makers. Apparel makers 20 run business using apparel original goods codes. (An apparel maker and a selling company may be affiliated companies of a single enterprise.)

Sewing companies 30 constitute a group of a plurality of independent sewing companies and run business independently of each other. These sewing companies may include a small company employing several sewers without using its own goods code. These sewing companies have business transaction or trading with a maker which handles annex goods (e.g., buttons and fasteners) required for sewing.

Material concerns 40 constitute a group of material manufacturing concerns (e.g., a thread company, a dyeing company, a fabric company, a sub-material company, a row material company) and material business concerns (e.g., a textile business concern and a sub-material business concern). Each material concern may be a specialized organization or a single enterprise (textile company).

Delivery service companies 50 deliver goods (or materials) among members 10 to 40.

Relating business fellows 60 include business consultants, accountants, advertizing companies, goods planners, trend watchers, and the like.

Delivery service companies 50 and/or relating business fellows 60 may be affiliated by a company which operates database 100.

Database 100 comprises a trading database (trading DB) for storing trading information of members 10 to 40 in real time, an apparel database (apparel DB) for storing various kinds of information of old and new goods manufactured by apparel makers 20, a manufacturing information database (manuf. info. DB) for storing manufacturing-associated information representing the steps from orders of materials of goods to sewing, a planning information database (planning DB) for storing information associated with new products to be sold, a managing support database (managing support DB) for storing information associated with managing support of members 10 to 60, and a textile database (textile DB) for storing information associated with fabrics used for textiles of goods.

Figure 2:
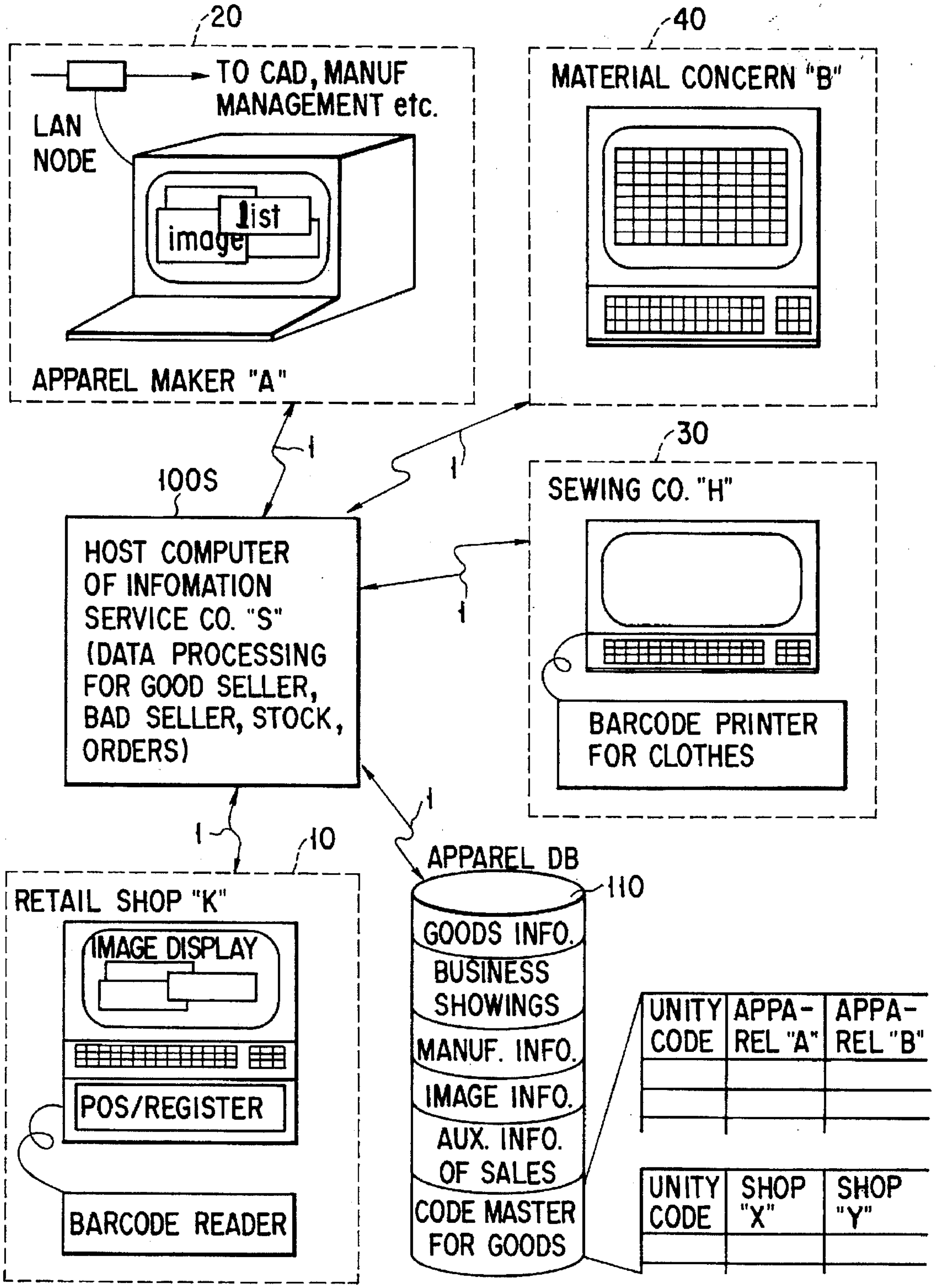
FIG. 2 is a diagram showing the peripheral environment of a host computer operated in the information service system using an integration database in FIG. 1.

FIG. 2 shows the peripheral environment of host computer 100S operated in the information service system (information service company "S") using integration database 100 shown in FIG. 1.

Referring to FIG. 2, host computer 100S uses information stored in apparel DB 110 to perform data processing for good sellers (or bad sellers), orders among members 10 to 40, stocks of goods or materials of members 10 to 40, and other processes.

Apparel maker "A" 20 accesses host computer 100S with, e.g., a graphic work station. Shop "K" 10 accesses host computer 100S using, e.g., an image display type POS terminal with a bar code reader. Sewing company "H" 30 accesses host computer 100S using, e.g., an exclusive terminal having a clothes bar code issuing unit. Material concern "B" 40 accesses host computer 100S using, e.g., a personal computer.

Apparel DB 110 store the following kinds of information.

1) Goods Information

Apparel numbers, sizes, goods classification, brands, kinds of clothes, weights, retail prices, wholesale prices, feelings or impressions, materials (textile information: exterior coverings, linings, buttons, fasteners, and the like), quality information (caution for cleaning), and others

*Textile information

Goods numbers, names of goods, kinds of threads (tradenames, thicknesses, wefts, warps, and others), twist yarns, fabrics (texture, density, and others), color, printed patterns, finishing, prices (processing fees), delivery, widths, lengths, weights, order lots, feelings or impressions, sales seasons (sales period and its start), appropriate kinds of clothes, selling companies, planning companies, quality test information, stocked materials, sewing conditions, dyeing methods, seasons, row material codes, and others 2) Business Showing Information Sales volumes, goods number, unit prices, delivery, payment classification, account data, goods category, dates, makers, vendors, areas, kinds of clothes, information representing whether clothes can be sold as goods, and others 3) Manufacturing Information Delivery, (material warehousing and goods delivery), processing fees (standard), sewing countries, sewing factories, processing methods, minimum order lots, needles, threads, thread pressures, attachments, parts variations (e.g., textile, annex goods, and pattern information), finishing conditions, quality test information, results, failure results, press (ironing) conditions, and others

*Classification of Manufacturing Information

Past Processing History:

manufacturing processes, factories, dates of delivery, delivery costs, and the like Processing Information:

information representing how processing instructions (especially finishing, quality test information, and sewing conditions) are made based on information from goods information 4) Image Information Clothes in silhouette, design sketches, photographs of models who wear clothes, and others 5) Stock Information (trading-associated information)

Stock amounts (e.g., goods numbers, goods category, dates, makers, sales shops, areas, and kinds of clothes), warehousing unit prices, dates of warehousing, market prices, good/bad seller information, and others 6) Code Master for Goods The code master for goods is a list including apparel and shop goods codes and unity codes corresponding thereto.

Figure 3:
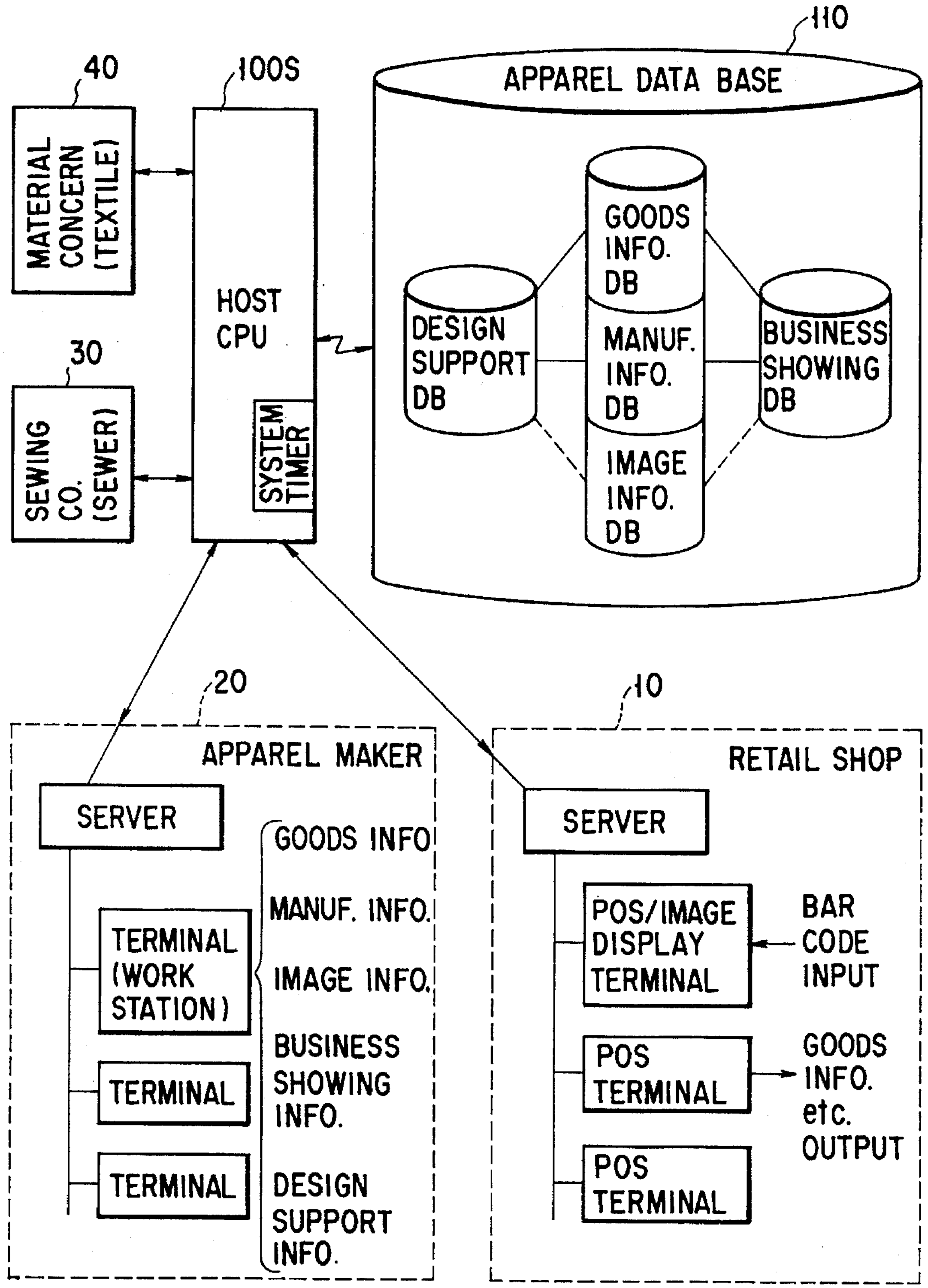
FIG. 3 is a diagram showing an arrangement of an internal network of apparel makers and retail shops in the arrangement of FIG. 2 and a correlation between sub-databases in an apparel DB.

FIG. 3 shows arrangements of internal networks of an apparel maker and a retail shop which have arrangements shown in FIG. 2, and their correlation with the sub-database in apparel DB 110.

Referring to FIG. 3, host 100S is connected to each apparel maker through an apparel server. This server is connected to the terminal (work station) of each apparel maker to constitute a network. A person in charge of each apparel maker accesses apparel DB 110 utilizing its own terminal to register/read out (upload/download) desired goods information, desired manufacturing information, desired image information, and desired design support information.

Similarly, host 100S is connected to each retail shop through a shop server. This server is connected to the POS terminal of each retail shop to constitute a network. A person in charge in each retail shop accesses apparel DB 110 using his own terminal to upload goods sales information as a bar code input and download desired goods information (good/bad seller information).

FIGS. 4A–4E show a code master for goods, included in apparel DB 110 shown in FIG. 2. The form of the code master for goods is changed depending on which one of members 10 to 60 in FIG. 1 is centered to arrange a system (the contents of the code master for goods are kept unchanged). A goods code master having the unity codes centered on the apparel makers will be exemplified below.

Individual recognition numbers (ID numbers) are assigned from a system (information service company) to respective members 10 to 60 (particularly the apparel makers and retail shops). When goods (female dress) is uploaded from apparel maker "A" to apparel DB 110, host computer 100S writes an apparel maker "A" ID and apparel goods code CODE used originally for this goods by apparel maker "A" in the code master for goods shown in FIG. 4A.

At this time, host computer 110S writes a new code (ID+CODE; this CODE is in a one-to-one correspondence with the apparel goods code) as a synthesis of the "A" ID and apparel goods code CODE as a unity code in the code master for goods in FIG. 4A. Apparel maker "A" can use its own original goods code CODE to access information associated with the corresponding goods. The system (host computer 100S and its peripheral terminals) in FIGS. 1 to 3 can use the unity code (ID+CODE) different from goods codes CODE of apparel maker "A" to access information associated with the corresponding goods.

Assume that shop "K" independent of apparel maker "A" accesses the apparel DB and finds a dress represented by goods code CODE of apparel maker "A". In this case, when shop "K" accesses (searches and the like) the corresponding clothes/dress information, host computer 110S writes a shop goods code assigned to the dress by shop "K" in a unity code column of this dress together with the user (member) ID of shop "K" (FIG. 4B). The shop goods code used for this dress by shop "K" is linked to the unity code (ID+CODE).

When the shop goods code is linked to the unity code as described above, the apparel goods code of a given goods can be set to correspond to the shop goods code of the given goods (FIG. 4C). Therefore, shop "K" can access goods information using its own goods code.

When apparel maker "A" is replaced with material concern "B", and shop "K" is replaced with apparel maker "A", a textile code used for the textile of this goods can be set to correspond to the textile code (FIG. 4D).

Various kinds of goods registered as described above are compiled by unity codes together with additional information such as offered list prices (FIG. 4E).

Upon compiling the goods information, a system member who does not know a goods code used by another apparel maker or another retail shop can use the unity code to access the corresponding goods in database 100. In this case, only one unity code represents only one goods, and similar goods will not be mixed up. (When apparel maker "A1" tries to access goods information of apparel maker "A2" without employing a unity code, confusion may occur. For example, even if goods code X1 of "A1" represents a green one-piece dress, code X1 of "A2" may designate a blue skirt.)

In the above example, apparel maker "A" uses an apparel original goods code or unity code to access its own goods information, and shop "K" uses a shop original goods code or unit code to access target goods information. Other members (sewing companies and material concerns) can use the unity code to access target goods information.

When apparel maker "A" and shop "K" successfully negotiate with each other about a given goods (clothes), and materials and sewing of this clothes are to be ordered, the names (or ID numbers) of apparel maker "A" and shop "K" are informed together with the unity code of this goods to sewing company 30 and material concern 40 which receive this order. Sewing company 30 and material concern 40 which have received the order can specify the buyers and the contents of the order. Sewing company 30 can issue a bar code of the ordered clothes on the basis of the unity code and information derived from the buyer's IDs.

There is a high possibility of receiving inquiries from a plurality of retail shops for one apparel goods. A plurality of shop (user) IDs are often assigned to the same apparel goods code in FIG. 4C. In this case, the same codes are aligned in the apparel goods code column in FIG. 4C but can be distinguished by different user IDs listed to the right of the same apparel goods codes.

In other words, one apparel goods code corresponds to one unity code, and it is possible to assign a plurality of user IDs to one unity code. In this case, a combination of one unity code and one user ID can determine a specific shop user for the goods of a specific apparel maker.

Various kinds of information can be uploaded/ downloaded using unity codes in the trading DB, the manufacturing information DB, the planning information DB, the managing support DB, the textile DB of unity database 100 in FIG. 1 in the same manner as in the apparel DB.

Figure 5:
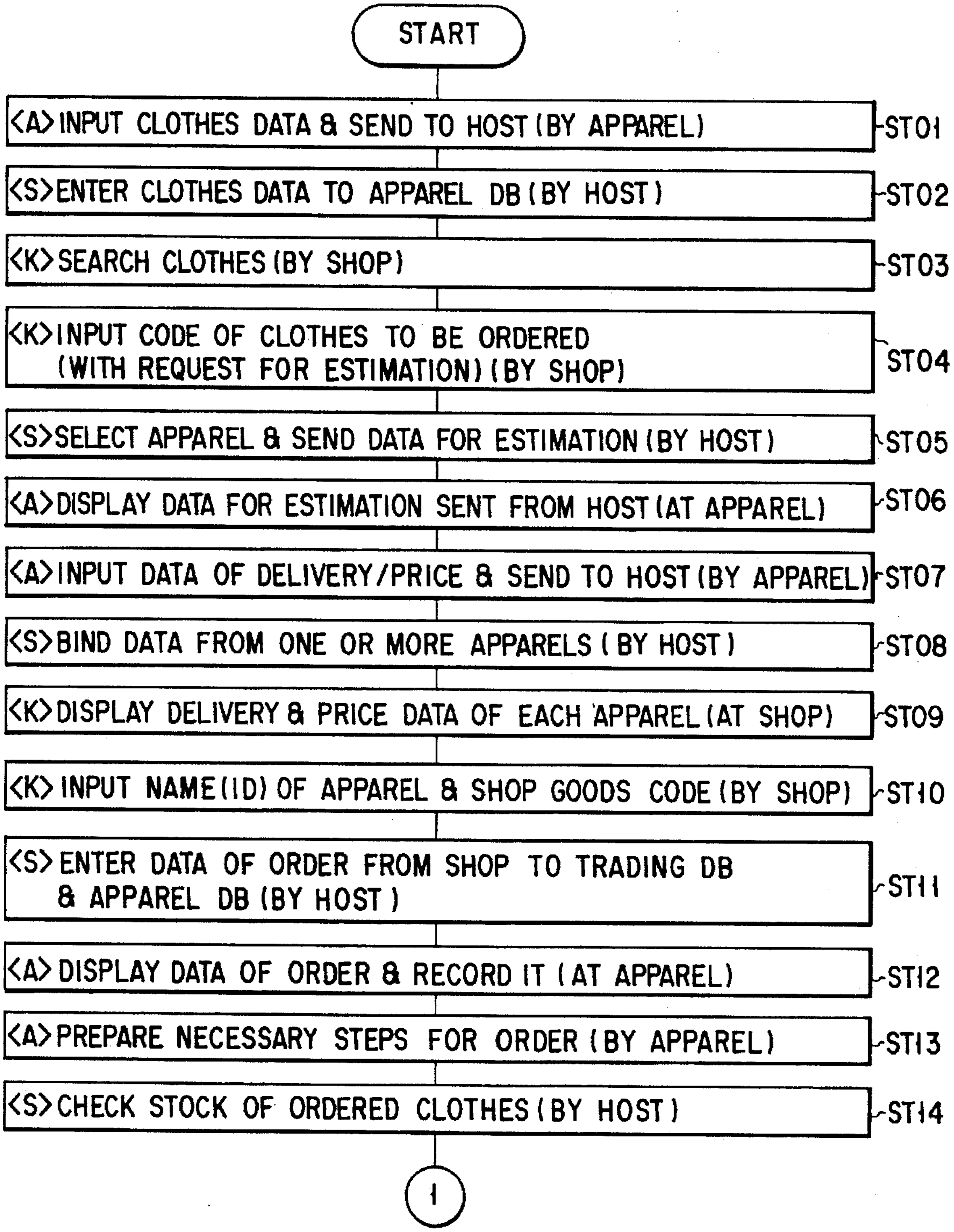
FIG. 5 is a flow chart for explaining a processing sequence of the information service system (FIG. 1) centered on processing in host computer 100S in FIG. 2.
Figure 6:
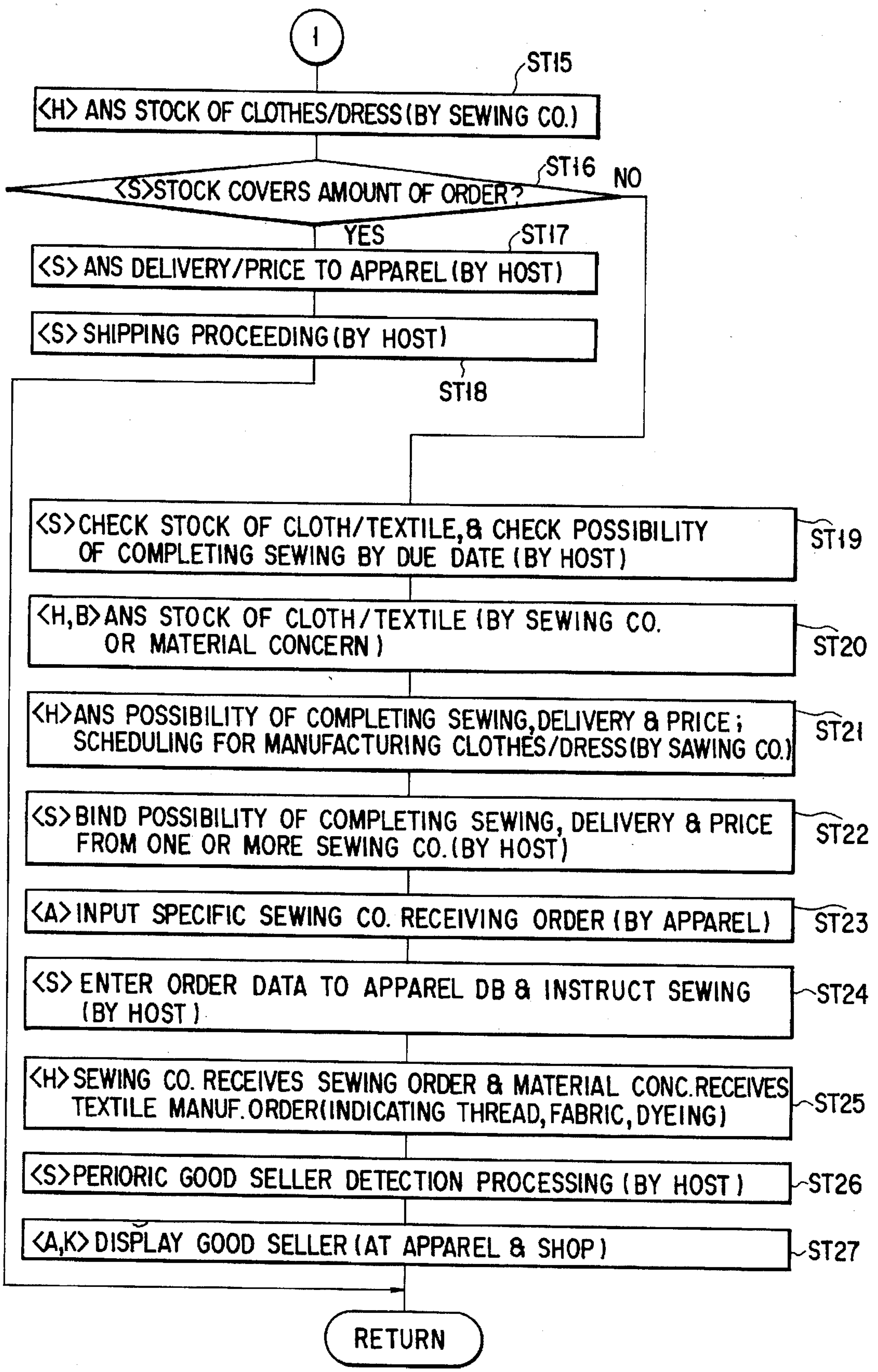
FIG. 6 is a flow chart for explaining the continuation of the processing sequence in Pig. 5.

FIGS. 5 and 6 are flow charts for explaining the process of the information service system in FIG. 1 and mainly the process of host computer 100S in FIG. 2. In each block in the flow charts of FIGS. 5 and 6, <A> represents a process performed by an apparel maker, <S> represents a process performed by the host computer, <K> represents a process performed by a retail shop, <H> represents a process performed by a sewing company, and <B> represents a process performed by a material concern.

Assume that apparel maker "A" 20 registers (uploads) a new future goods (e.g., female dress) using its own work station. This registration is performed on a data input template shown in FIG. 15 (ST01 in FIG. 5). The input data is entered in apparel DB 110 (ST02 in FIG. 5).

Figure 15:
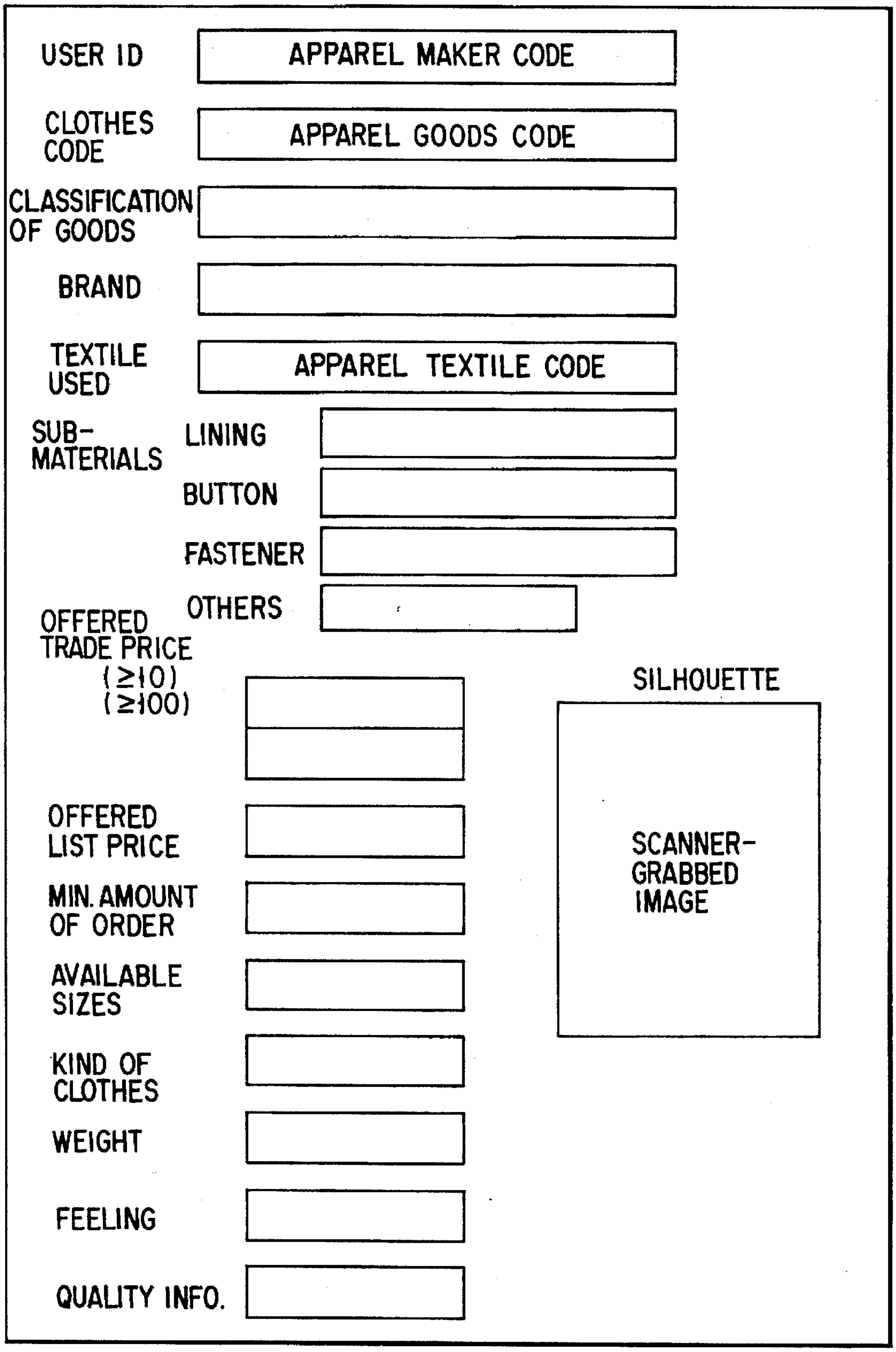
FIG. 15 is a view showing a template of inputting goods data from an apparel maker.

Referring to FIG. 15, an apparel maker code assigned in advance from information service company "S" (or value-added system Co. or VAS) is input to the column of user ID. A goods code used for this clothes by the apparel maker is input to the column of clothes code. The input apparel maker code and goods code are written in a code master for goods (FIG. 4A) together with its unity code (this code consists of a user ID and a clothes code). A classified goods (e.g., female dress) is input to the column of classification of goods. A brand used for the goods by the apparel maker is input in the column of brand. A textile code used by the apparel maker is input in the column of textile used. The input textile code is written in the code master for goods (FIG. 4D) together with its unity code (user ID+textile code).

In the sub-material items, the name (or code) of lining is input in the column of lining, the name (or code) of button is input in the column of button, and the name (or code) of fastener is input in the column of fastener. If any other sub-material used is available, it is also input.

An offered unit price corresponding to an amount of order is input to the column of offered trade unit price. An offered list price need not be designated by the apparel maker side. If an offered list price is to be designated so as to prevent a low-end image of the brand, an offered list price is input in this column. A minimum amount of order (an amount of an order-made goods may be one) of the goods is input in the column of minimum amount of order.

Available sizes (e.g., S, M, L, and LL) of the goods (clothes) are input in the column of available sizes. A kind of clothes (e.g., a one-piece dress) is input in the column of kind of clothes. An image of clothes is briefly described in the column of feeling. Cautions as of cleaning and storage are described in the column of quality information.

A front view (silhouette representing the outer appearance) of the goods (clothes) or an image (bit map data) obtained by reading the outer appearance of the goods from the front is painted in the column of silhouette.

Goods data stored in the format of FIG. 15 in the apparel DB is assigned with the unity code described with reference to FIG. 4. A third party except for apparel maker "A" which enters this goods information can specify this goods (clothes) using the unity code shown in FIG. 4E.

Assume that shop "K" 10 in FIG. 2 accesses the apparel DB to find new goods to be displayed in the shop. In this case, shop "K" inputs a search key item on the goods data search template in FIG. 16 through its own terminal. (At this moment, shop "K" does not know the presence of registered goods of apparel maker "A".)

Referring to FIG. 16, shop "K" wants to limit target goods to be searched to those of specific apparel makers, shop "K" inputs the names of desired apparel makers or their user IDs (if known). The classified goods as clothes to be searched is also input. (If this input is not made, a search operation by a female boutique may cover male suits as wrong classified goods, the search operation is undesirably prolonged, and unnecessary information may be retrieved.)

If shop "K" wants to limit target goods to be searched to a specific brand, this brand or its code (if known) is input in the column of brand. Similar, the textile of the goods to be searched is to be specified, the name of desired textile or its code (if known) (e.g., AZ10346) is input in the column of textile used.

A search operation using a silhouette as a key item can be performed by pattern recognition. For example, an edge portion of dot-set-data of a silhouette registered in FIG. 15 and an edge portion of dot-set-data of a silhouette input in FIG. 16 are corrected to have equal areas and then compared with each other. Goods data having silhouettes similar to the silhouette as the key item are searched on the basis of a criterion representing whether an average error between the edge dot positions of the two silhouettes within a plurality of small regions of two-dimensional planes including these silhouettes is smaller than a predetermined amount. In the search of similar silhouettes, empirical law data of manual similar silhouette search operations may be gathered, and a fuzzy inference may be utilized.

An offered list price range (e.g., 20,000 yen to 30,000 yen) of clothes to be searched is input, if needed. If high-quality goods are to be searched regardless of prices, this column is left blanked. The size, weight, feeling, quality information, and silhouette of the clothes to be searched are also input as needed.

If key items input by shop "K" in FIG. 16 are two items, i.e., an offered list price range of 20,000 yen to 30,000 yen and the textile code of AZ10346, host computer 100S searches items in apparel DB 110 on the basis of these two key items (ST03 in FIG. 5).

Assume that twenty entries or items corresponding to these two key items are found. A search result shown in FIG. 17 is sent back to the terminal screen of shop "K".

20 items as the number of items found as a result of searching under the condition for searching designated by shop "K" are displayed. To display the search result, Y (yes) is entered from the terminal keyboard in response to the prompt representing whether the searched items are displayed, and the return key (enter key) is depressed. (Service fees vary depending on whether the found information is displayed.) Search numbers (01 to 20), codes (or names) of apparel makers handling the searched goods (clothes), clothes codes of the clothes which are used by the apparel makers, the names (or brands) of the clothes, and prices of the clothes which are offered by the apparel makers are listed up.

In the search result list in FIG. 17, when a search operator at shop "K" moves the terminal cursor to a desired search number, the silhouette of this clothes, other additional information (not shown) associated with this clothes, and data (data for assisting preparation of an estimation request) of the apparel maker handling this clothes are additionally displayed at the terminal CRT. Shop "K" can use these pieces of information to determine whether the clothes are to be ordered from this apparel maker.

Shop "K" picks up several desired apparel makers with reference to the clothes data and data of apparel makers handling these clothes and inputs the picked search numbers, requested delivery of the goods (clothes), amounts of order, offered prices from the estimation request input template in FIG. 17 (ST04 in FIG. 5).

Host computer 100S forms an estimation (FIG. 18) to each apparel maker with reference to the estimation request condition of shop "K", the goods information in FIG. 15, and the like. Host computer 100S sends this estimation request to each apparel maker designated by shop "K" with the search number in FIG. 17 (ST05 in FIG. 5).

Each apparel maker may often receive estimation request from a plurality of retail shops for the same goods (clothes). In this case, estimation request data sent to, e.g., apparel maker "A" include estimation request serial numbers, names (ID codes) of retail shops sending the estimation requests, names (brands) of clothes subjected to estimation, requested delivery (e.g., Mar. 10, Mar. 20, and Mar. 30), sizes (e.g., S and M), colors (e.g., red and blue), amounts (e.g., 30 for S size and 50 for M size), an offered list price (e.g., 10,000 yen), and estimation numbers (e.g., 000001-1), as shown in FIG. 18.

Figure 18:
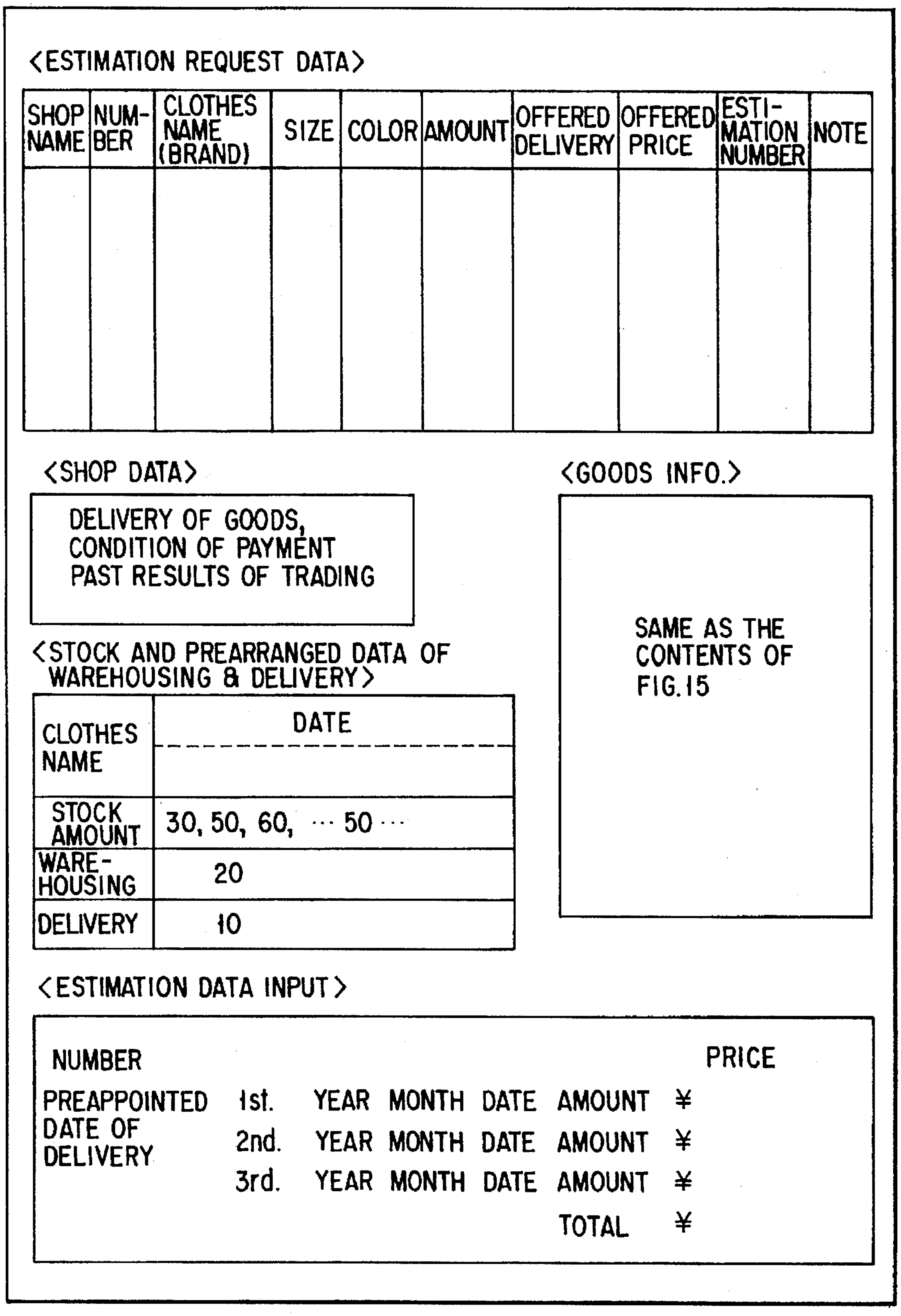
FIG. 18 is a view showing a template of displaying estimation request data at an apparel maker and an input template for estimation data.

The estimation request sent to apparel maker "A" also includes shop data for sending the estimation request, warehousing/delivery data of the clothes, and an estimation data input template in which data is input by apparel maker "A", as shown in FIG. 18.

Note that the shop data, the goods information, and the warehousing/delivery data in FIG. 18 need not always be displayed, but may be displayed as needed.

An estimation request shown in FIG. 18 is sent to each apparel maker picked up by shop "K" through host computer 100S. This is displayed on the terminal screen of each apparel maker (ST06 in FIG. 5).

Upon reception of the estimation request, apparel maker "A" enters data such as a preappointed date of delivery, an amount of delivery, and a price in the corresponding estimation data input columns. The resultant estimation is sent back to host computer 100S (ST07 in FIG. 5).

Figure 19:
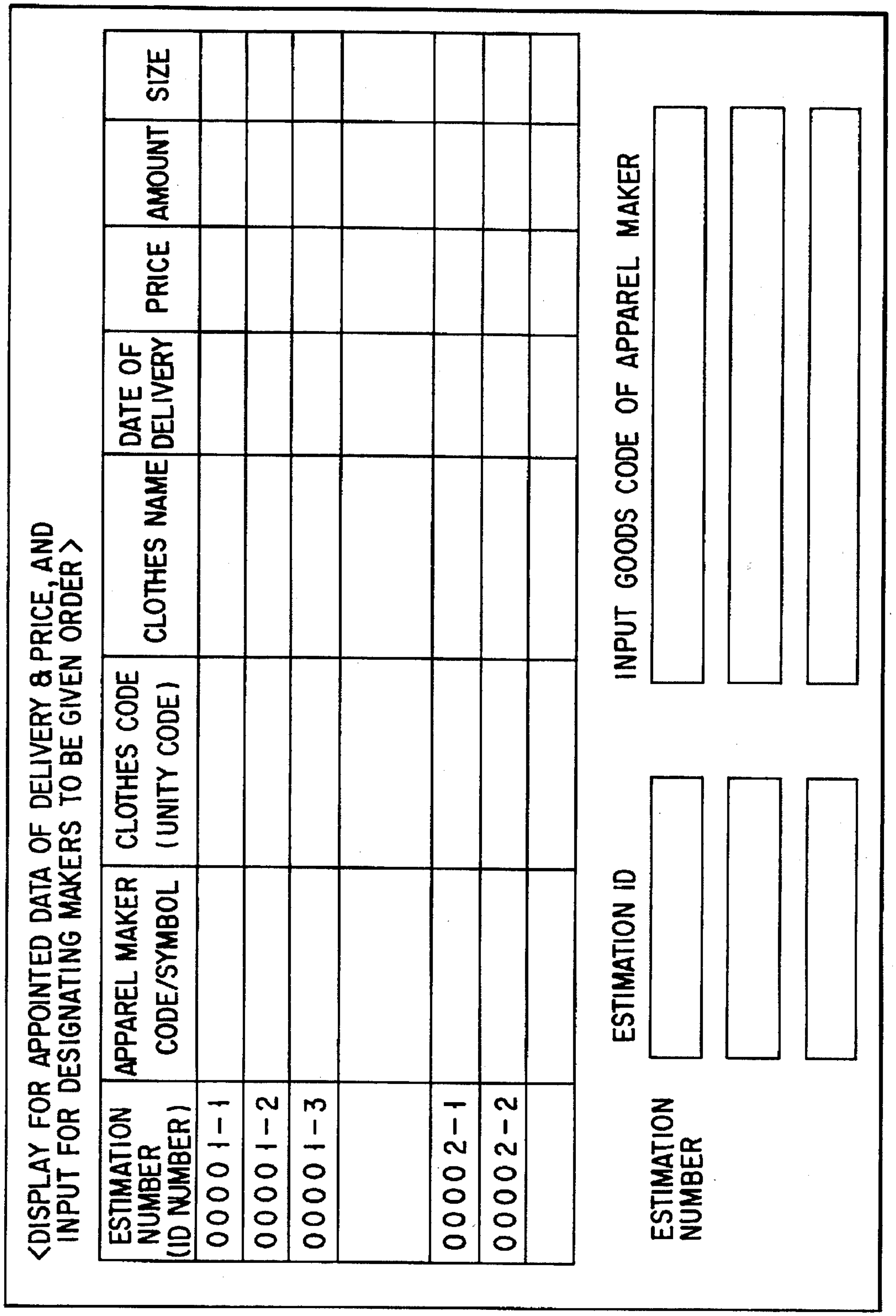
FIG. 19 is a view showing an estimation answer list displayed at a retail shop which requests an estimation in a form obtained by binding a plurality of estimation answers offered by a plurality of apparel makers, and a template of inputting for designating makers to be a given order.

The estimation data answered from apparel maker "A" is written in the column of estimation number 000001-1 in FIG. 19. When apparel maker "A" receives an estimation request for three kinds of clothes and answers it, predetermined data are also written in the columns of estimation numbers 000001-2 and 000001-3. (Estimation answer data from another apparel maker are written in the columns of estimation numbers 000002-1 and 000002-2.) In this state, unity codes serving as common identifiers are used to specify the goods (clothes) for a plurality of apparel makers and a plurality of retail shops.

Host computer 100S binds the estimation answers from the apparel makers to which shop "K" sends the estimation requests (ST08 in FIG. 5). The bound estimation data are sent to shop "K". The answers (delivery, price, and the like as the contents of the estimation data input in FIG. 18) from the apparel makers are displayed on the terminal screen of shop "K" (ST09 in FIG. 5).

Shop "K" systematically or totally examines and evaluates the displayed answers from the apparel makers and the data (FIG. 17) for assisting preparation of an estimation request and determines one or more apparel makers to which the goods are to be ordered. When an apparel maker as a seller is determined, the shop "K" uses an apparel maker code or the like to specify the desired apparel maker and inputs, as order data, an apparel goods code (shop goods code used by shop "K") of the clothes of the apparel maker to which the goods are to be ordered (ST10 in FIG. 5). This data input can be performed using the lower half format (FIG. 19) as a template.

The input order data is input to the trading DB and the apparel DB in integration database 100 in Pig. 1 through host computer 100S (ST11 in Pig. 5). The unity code of the corresponding goods (clothes) of apparel maker "A", the user ID of shop "K", and shop goods code of the corresponding goods (clothes) of shop "K" are linked in database 100, as shown in FIG. 4B.

By the above process, when a seller is determined (i.e., when shop "K" and apparel maker "A" successfully negotiate with each other for the corresponding clothes), data of accepted orders in units of retail shops are listed up on the terminal screen of apparel maker "A", as shown in FIG. 20, and are preserved as a business record of apparel maker "A" (ST12 in FIG. 5).

By the above process, when shop "K" and apparel maker "A" successfully negotiate with each other, apparel maker "A" prepares necessary steps for the order (ST13 in FIG. 5). To confirm the stock of the corresponding goods (clothes), host computer 100S uses the unity code to inquire the stock to each sewing company 30 (ST14 in FIG. 5).

In response to this inquiry, each sewing company 30 sends back a deliverable stock amount to information service company "S" (ST15 in FIG. 6). (A sewing company may answer to company "S" that a stock of 30 clothes is available although the sewing company has a stock of 100 clothes due to its own convenience.) When stock data from sewing companies 30 are gathered and a total stock covers an amount of order (YES in ST16) in FIG. 6, host computer 100S answers the preappointed date of delivery of the stock and the price to apparel maker "A" (ST17 in FIG. 6). Host computer 100S prepares the steps for delivery of the stock unless apparel maker "A" cancels the order (ST18 in FIG. 6).

If answers indicating available stocks are sent from material concern "B" and/or sewing company "H" (ST20 in FIG. 6), sewing company "H" which has received an inquiry sends data of a sewing possibility, a preappointed date of delivery, and a price to host computer 100S and makes a manufacturing schedule in accordance with the preappointed date of delivery (ST21 in FIG. 6).

Steps ST14 to ST21 may be manually performed by persons in charge in place of host computer 100S.

Host computer 100S binds the sewing possibilities, the preappointed dates of delivery, the prices, and the like answered by all the sewing companies, and the bound data is sent to apparel maker "A" (ST22 in FIG. 6). Apparel maker "A" examines and evaluates the answers from all the sewing companies and determines a specific sewing company to which the goods are to be ordered. Apparel maker "A" enters order data to one or more sewing companies determined by apparel maker "A" (ST23 in FIG. 6).

The order data from apparel maker "A" is entered in the apparel DB, and at the same time, a sewing (clothes manufacturing) instruction is sent to one or more sewing companies (ST24 in FIG. 6). At this time, if the stock of textile required for sewing in the sewing company is short, it sends a desired textile manufacturing request (including instructions for threads, fabric, and dyeing of the textile) to material concern "B". The sewing company of the ordered clothes, and material concern "B" of the ordered clothes receive the sewing request and the textile manufacturing request, respectively (ST25 in FIG. 6).

At the end of this request, host computer 100S performs periodic good seller detection processing (ST26 in FIG. 6). The processing result is transferred to each apparel maker and each retail shop. The good seller detection processing result is displayed as, e.g., a graph in FIG. 14 on the terminal screen of each apparel maker or each retail shop. If shop "K" which has ordered the clothes to apparel maker "A" determines that the ordered clothes can be sold in an amount exceeding the amount of order, an amount of order can be increased or changed. Upon reception of the change in amount of order, apparel maker "A" immediately instructs to increase the amount of order to the sewing company.

Figure 7:
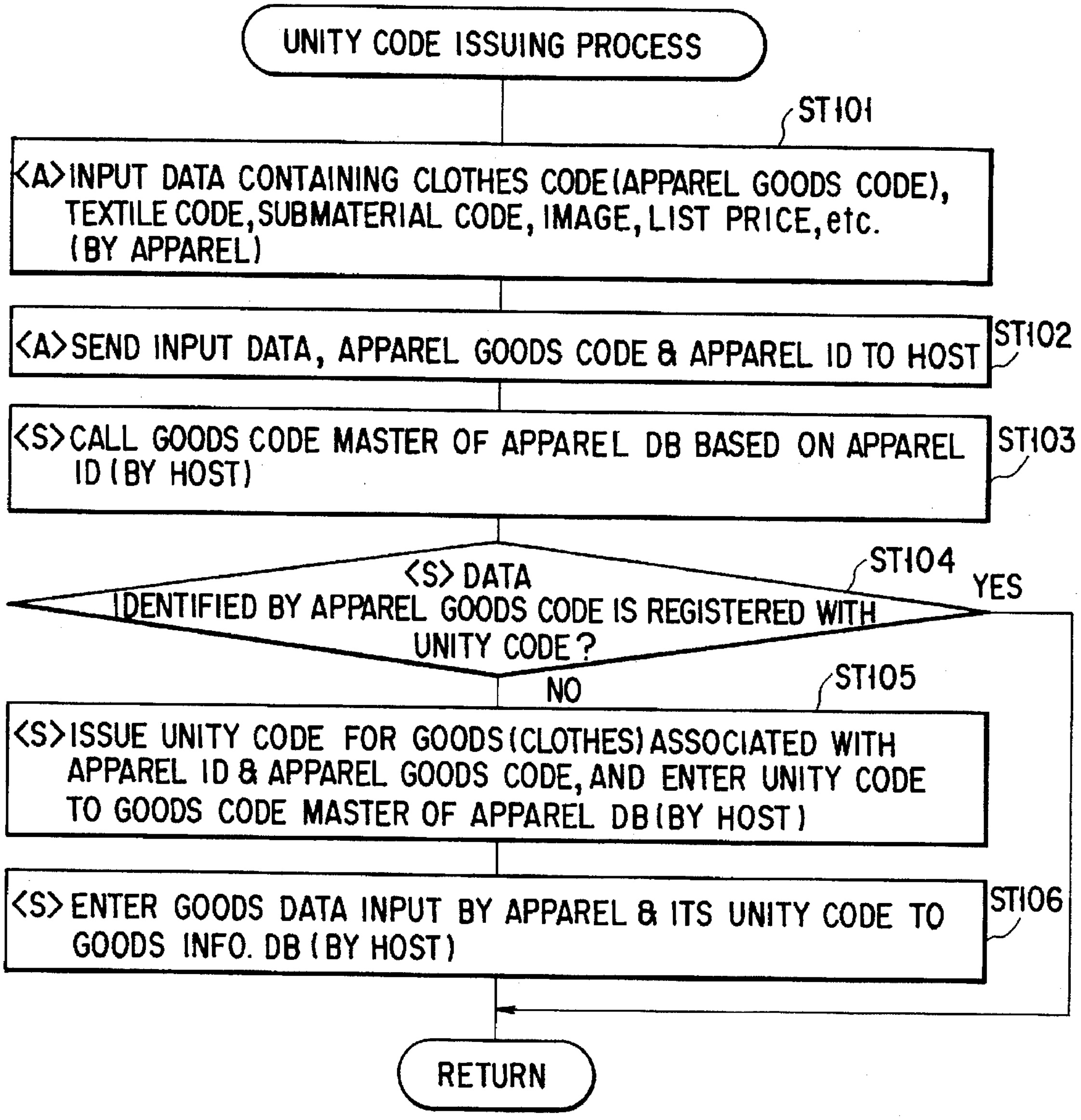
FIG. 7 is a flow chart for explaining the sequence of a unity code issuing process.

FIG. 7 is a flow chart for explaining the sequence of a unity code issuing process. Assume that apparel maker "A" is a new member in information service company "S" (VAS) and accesses database 100 in FIG. 1 for the first time.

An operator in apparel maker "A" inputs its own clothes codes, textile codes, sub-material codes, image data (silhouette), offered list prices, and the like of its own goods to be registered, using the format in FIG. 15 from its own terminal screen (ST101). During the input operations, apparel goods codes of these goods and an apparel ID number are added by software running in the terminal.

The terminal of apparel maker "A" transfers input data together with the apparel goods codes and the apparel ID number to host computer 100S through packets via a telephone line (ST102).

Host computer 100S calls a code master for goods of apparel DB 110 on the basis of the transferred apparel ID number (ST103). Subsequently, host computer 100S checks if the same apparel goods code data are already registered together with the unity codes in the called code master for goods (ST104).

In this case, as apparel maker "A" accesses database 100 for the first time, the same apparel goods code data are not registered together with the unity codes (NO in ST104).

In this case, a unity code for a clothes (registered goods) for uniting the apparel ID and the apparel goods code is issued, as shown in FIG. 4A, and this unity code is stored in goods information DB in apparel DB 110 (ST106).

When the same apparel goods code data is already stored together with the unity code in the called code master for goods (YES in ST104), steps ST105 and ST106 are skipped.

In this case, although a simple combination of the apparel ID and the apparel goods code serves as a unity code, the following conversion may be performed not to easily identify the goods code from the unity code.

A confidential code conversion table may be stored in a memory in host computer 100S. The apparel ID and the apparel goods code serve as an address for this conversion table. When the apparel ID and the apparel goods code are given, the corresponding unity code is output from this conversion table.

As described above, it is often necessary not to estimate an apparel goods code (or shop goods code) from the corresponding unity code.

For example, if simple combinations of an apparel ID (XYZ) and apparel goods codes (123456, 789123, 456789, . . . ) constitute unity codes (XYZ123456, XYz789123, XYZ456789, . . .), the third party (e.g., a competitor to apparel maker "A") who access database 100 using these unity codes can know the entire goods code system of "A" from the unity codes used for the registered goods of apparel maker "A". The trading conditions performed by apparel maker "A" using its own goods codes (these codes are used as passwords to the third party) may leak to the third party.

A possibility of leakage to the third party can be almost eliminated by the code conversion table. For example, an apparel ID (XYZ) and apparel goods codes (123456, 789123, 456789, . . . ) are used and converted to obtain unity codes (XYZ951357, XYZ428615, XYZ769438, . . . ) which seem to be nothing to do with the actual apparel goods codes (123456, 789123, 456789, . . . )

If it is often inconvenient to make an apparel maker (or retail shop) ID number known to the third party from the unity code, a header portion (XYZ) of the unity code is also converted by the code conversion table. For example, an apparel ID (XYZ) and apparel goods codes (123456, 789123, 456789, . . . ) may be used and converted to form unity codes (ABC951357, DFK428615, GJM769438, . . . )

Figure 8:
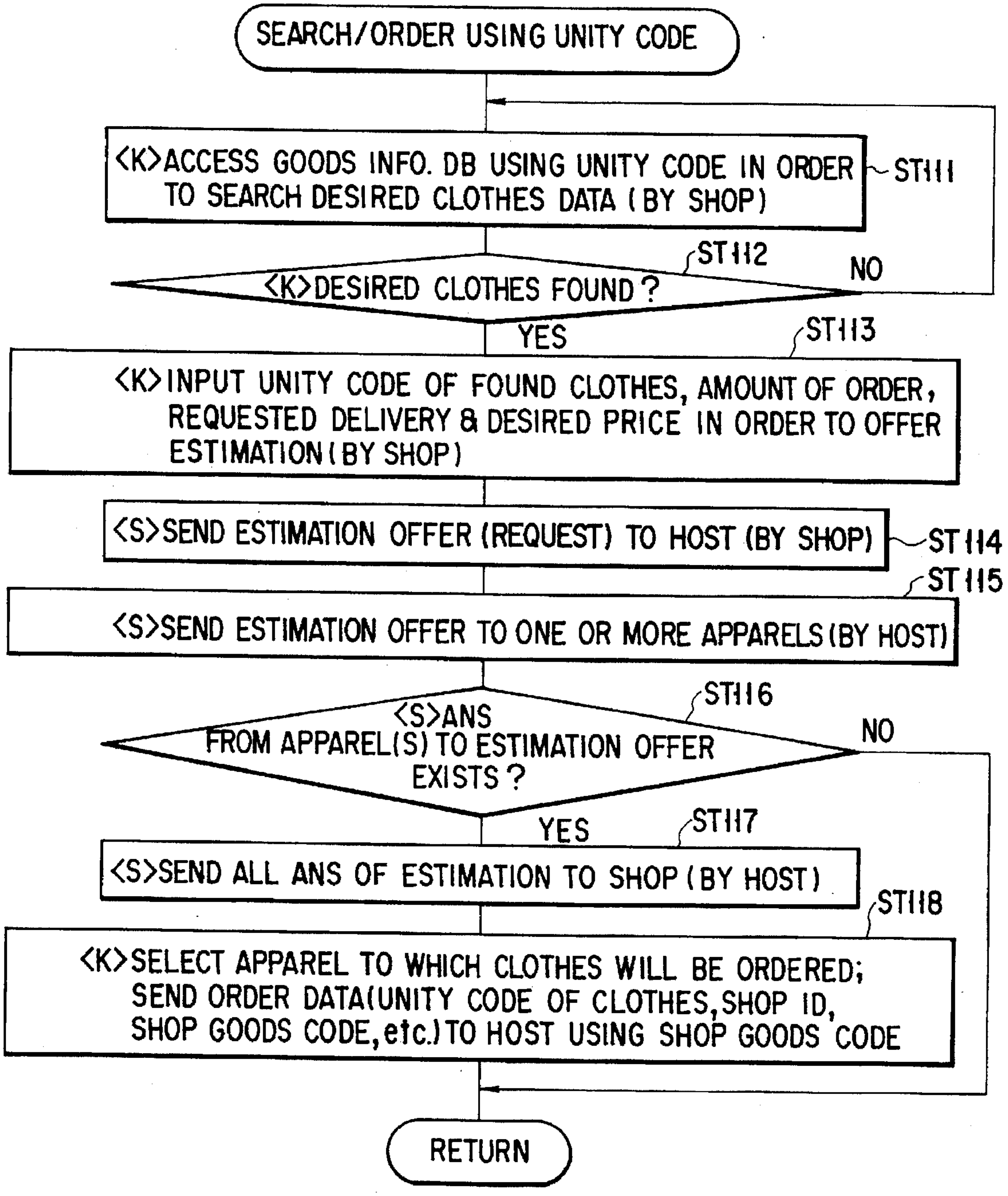
FIG. 8 is a flow chart for explaining the sequence of a search/order using a unity code.

FIG. 8 is a flow chart for explaining the sequence of a search/order using a unity code. Two methods are available to access apparel DB 110 by shop "K". According to one method, as described with reference to step ST03 in FIG. 5 (since the unity code is not known yet), several key items are input, and searching is performed based on these input key items. The other method is to input a unity code as a search key item. The latter method will be described below.

Shop "K" which has been connected in business with various apparel makers using database 100 knows the ID number of each apparel maker. If the ID number portion (XYZ) of the unity code (e.g., XYZ123456) of apparel maker "A" is known, shop "K" can search goods information DB using a wild card (e.g., XYZ??????, XYZ.*, or XYZ#?) to access the registered goods, i.e., desired clothes data of apparel maker "A" as needed (ST111).

The list (naturally including the unity codes of the listed goods) of accessed registered goods of apparel maker "A" is sent from host computer 100S to the terminal of shop "K" and is displayed. If a desired clothes is not found in the list (NO in ST112), another apparel maker unity code can be used to perform a search operation again (ST111).

If the desired clothes is found in the displayed list (YES in ST112), an amount of order, a requested delivery, an offered list price, and the like are input together with the corresponding unity code, thereby electronically forming an estimation request (ST113). The resultant estimation request is sent to host computer 100S (ST114).

Such estimation requests can be sent from other retail shops in addition to shop "K". Host computer 100S binds all the estimation requests and sends them to one or more corresponding apparel makers (ST115).

If any estimation answer from any apparel maker to which the estimation request is sent is received (YES in ST116), host computer 100S binds all the estimation answers and sends them to the corresponding shops (e.g., shop "K") (ST117).

Shop "K" which has received the estimation answers from, e.g., three apparel makers examines the contents of the estimation answers and determines a specific apparel maker to which the goods are to be ordered. If the apparel maker as a seller is determined, shop "K" forms order data (the unity code of the ordered clothes, the shop "K" ID, the goods code of shop "K" are written) using its own shop goods code. Shop "K" sends the order data to host computer 100S (ST118). If no answer is sent back from any apparel maker to which the estimation request is sent (NO in ST116), the process in FIG. 8 is ended.

Figure 9:
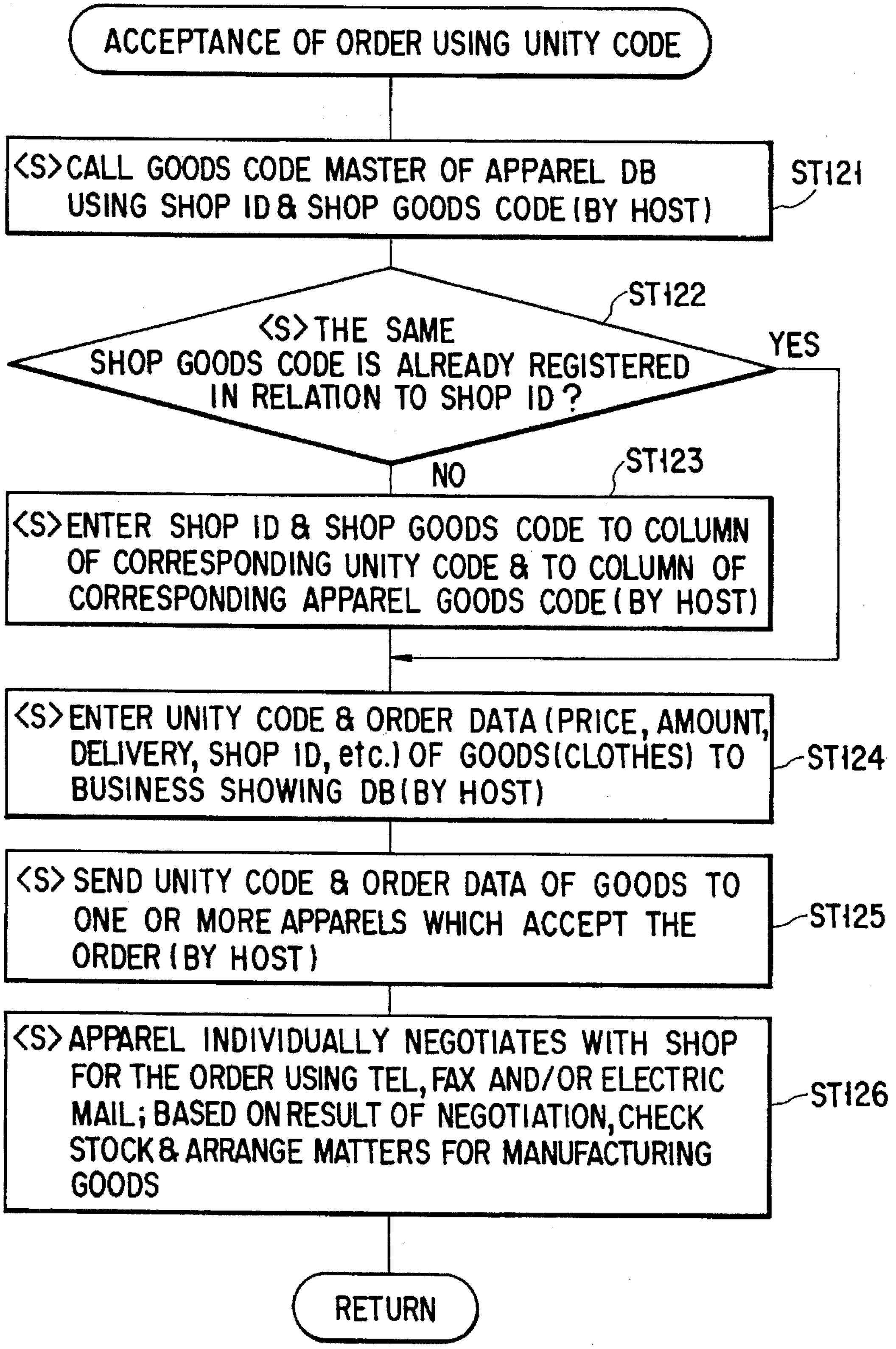
FIG. 9 is a flow chart for explaining the sequence of acceptance of an order using a unity code.

FIG. 9 is a flow chart for explaining the sequence of acceptance of an order using a unity code. When order data is sent from shop "K", host computer 100S calls the code master for goods of apparel DB 110 using the shop ID number and the shop goods code of shop "K" (ST121).

If the same goods code is not linked to the ID number of shop "K" in the called code master for goods (NO in ST122), the ID number of shop "K" and its shop goods code are written in the columns of unity code and apparel good code corresponding to the goods (ST123).

If the same goods code is linked with the ID number of shop "K" in the called code master for goods (YES in ST122), step ST123 is skipped.

Following the code link registration process, the unity code of the corresponding goods and order data (e.g., a price, an amount, a delivery, and a buyer ID) of this goods are written in the business showing DB (ST124). Thereafter, the unity code of this goods and the corresponding order data are sent to one or more apparel makers to which the goods are to be ordered (ST125).

Upon reception of the order data, the apparel maker negotiates with a buyer (shop "K") using a telephone, a facsimile apparatus, or an electric mail through host computer 100S. The apparel maker confirms the stock and prepares the proceedings for the manufacture on the basis of the negotiation result (ST126).

Figure 10:
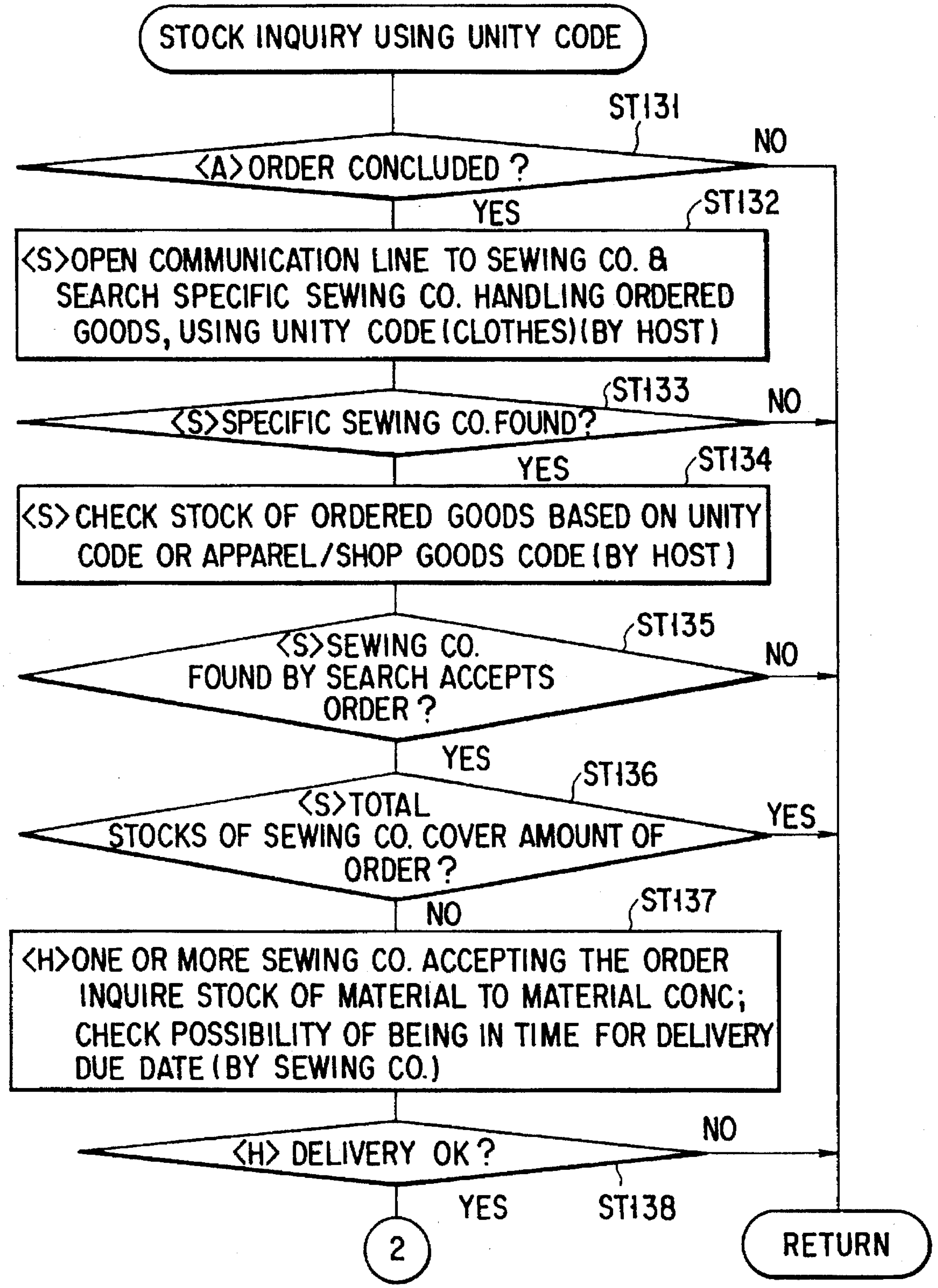
FIG. 10 is a flow chart for explaining the sequence of a stock inquiry using a unity code.
Figure 11:
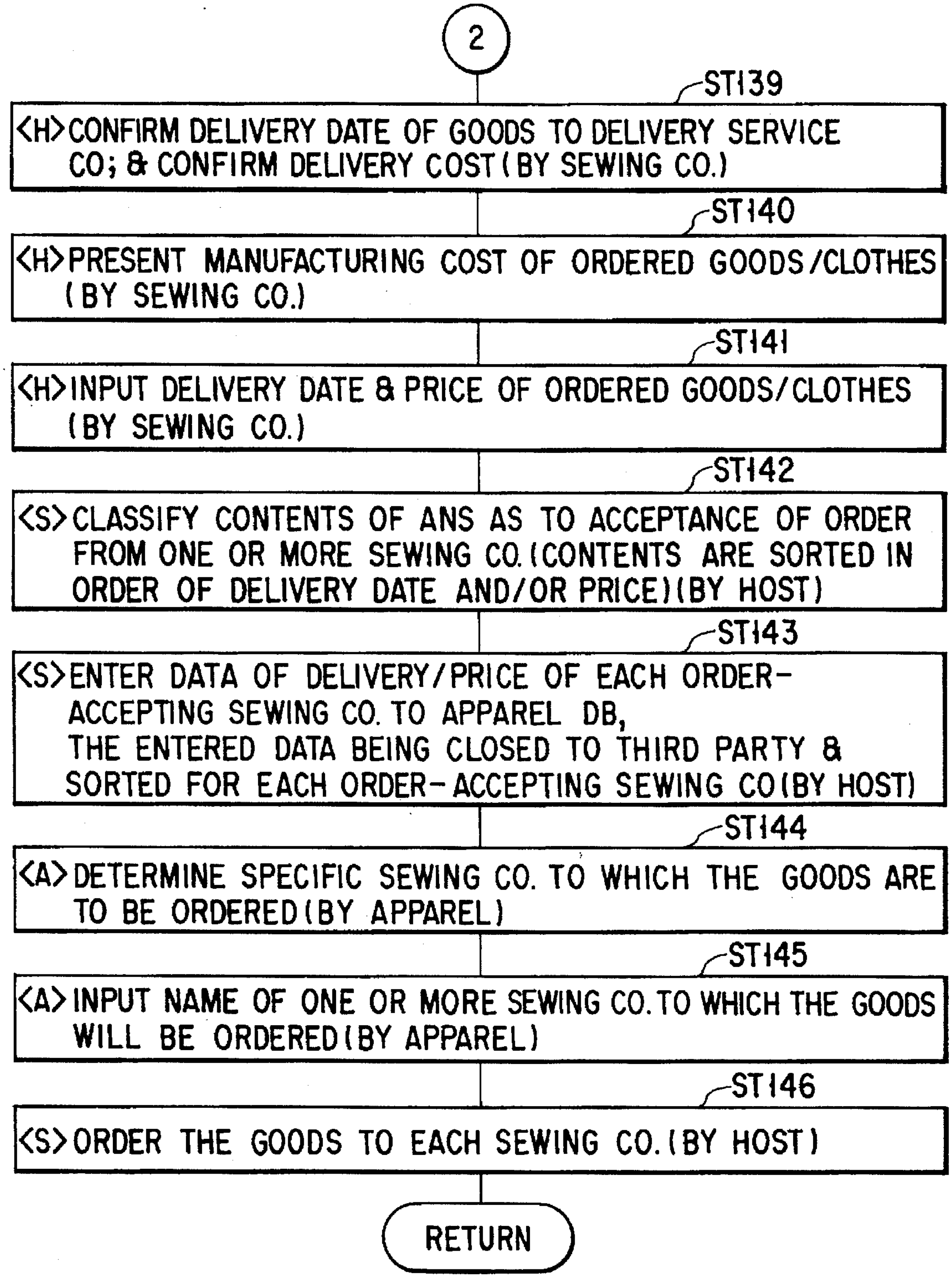
FIG. 11 is a flow chart for explaining the continuation of the sequence in FIG. 10.

FIGS. 10 and 11 are flow charts for explaining the sequence of a stock inquiry using a unity code. Upon exchange of electric mails, assume that apparel maker "A" receives an order from shop "K" and that a sales contract is made or the order is concluded (NO in ST131). In this case, host computer 100S engages with lines of all manufacturers (sewing companies) as system members and searches sewing companies handling the corresponding goods using the unity codes (ST132).

If a desired sewing company is not found (NO in ST133), the process in FIG. 10 is ended, and the end of process is informed to apparel maker "A". (In this case, apparel maker "A" may search an overseas sewing company without relying on the information service company "S" network in FIG. 2. If information service company "S" has its own overseas network, the overseas system members, i.e., the overseas sewing companies are covered with the search range in step ST132.)

If one or more desired sewing companies are found (YES in ST133), the stock of this sewing company is checked using the unity code (or apparel goods code) of the corresponding goods (ST134). As a result, if stocks are available from several sewing companies, orders are also made to these sewing companies.

If the order is not accepted by the sewing company to which the goods are to be ordered (NO in ST135), the process in FIG. 10 is ended. The end of process is informed to apparel maker "A". (The sewing company which Just receives an order may have a completed contract with another buyer for this goods. In this case, even if the goods are in stock, double booking cannot be performed.)

If one or more sewing companies receive an order (YES in ST135), it is checked whether the total stock of these sewing companies covers an amount of order from apparel maker "A". When the total stock covers the amount of order (YES in ST136), the process in FIG. 10 is ended, and the end of process is informed to apparel maker "A".

If the total stock of the sewing companies does not cover the amount of order (NO in ST136), desired goods (clothes) must be newly sewed. One or more sewing companies inquire the stock of the material (textile and the like) to material concerns (material consortia) and check a possibility of being in time for delivery (from the texture manufacture to sewing) due date (ST137). If the manufacture by due date is determined to be impossible (NO in ST138), it is informed to apparel maker "A" through host computer 100S. The process in FIG. 10 is ended.

If the manufacture by due date is possible (YES in ST138), the delivery to delivery service company 50 in FIG. 1 and the delivery cost are checked by the sewing company (ST139 in FIG. 11), and the cost including both the manufacturing cost of the ordered goods/clothes and their delivery cost is presented by the delivery service company (ST140). Subsequently, the sewing company inputs the delivery date and price of the ordered goods/clothes (ST141). The input delivery/price data are sent to host computer 100S.

Host computer 100S classifies the contents (e.g., delivery data and price data) of answers sent from one or more sewing companies in an order of delivery data and/or price (ST142).

Host computer 100S writes delivery data, the price data, and the like in apparel DB 110 in units of order-accepting sewing companies (ST143). Note that the delivery and price data of each sewing company must be closed from the third party, and a password is required to access these data. (This password is informed from each sewing company to the apparel maker as a buyer through a registered mail, a facsimile, or any other means.)

Apparel maker "A" determines one or more specific sewing companies to which the goods are to be ordered, on the basis of the delivery and price data written in the apparel DB (ST144). The determined sewing company is input on the terminal screen of apparel maker "A" (ST145). When the input sewing company name (or its ID number) is sent back, host computer 100S orders the goods to one or more sewing companies (ST146).

The processes in FIGS. 5 to 11 are repeated at random for a large number of members (apparel makers, retail shops, sewing companies, material concerns, and the like) to increase the contents of integration database 100 in FIG. 1. This database 100 grows and is extended during system operations. When unity codes are employed, all the registered goods will not be mixed up and can be properly identified. A large number of indefinite members can freely access the contents of database 100 (except for confidential items).

When the size of database 100 is larger than a predetermined size during system operations, independent individual retail shops or apparel makers can obtain information which has not been easily accessible. Such information will be exemplified by a real-time information service for good sellers in the entire apparel business world.

The contents of database 100 instantaneously change during system operations. Assume that a request for starting a process for detecting a good seller of a day (or a given period before this day) at twelve midnight (0 a.m.) is generated using a system timer in host computer 100S.

Figure 12:
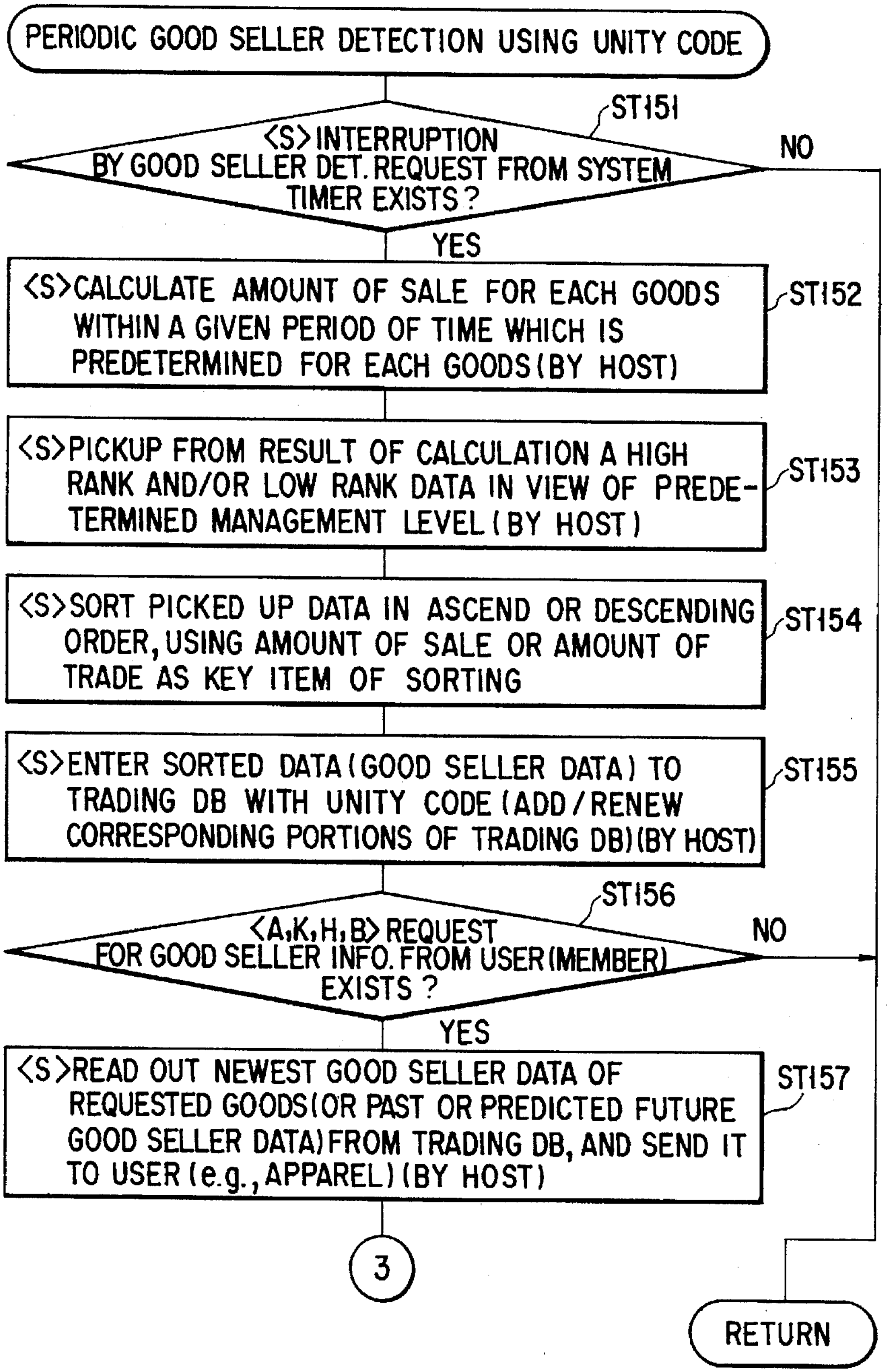
FIG. 12 is a flow chart for explaining the sequence of periodic good seller detection using a unity code.
Figure 13:
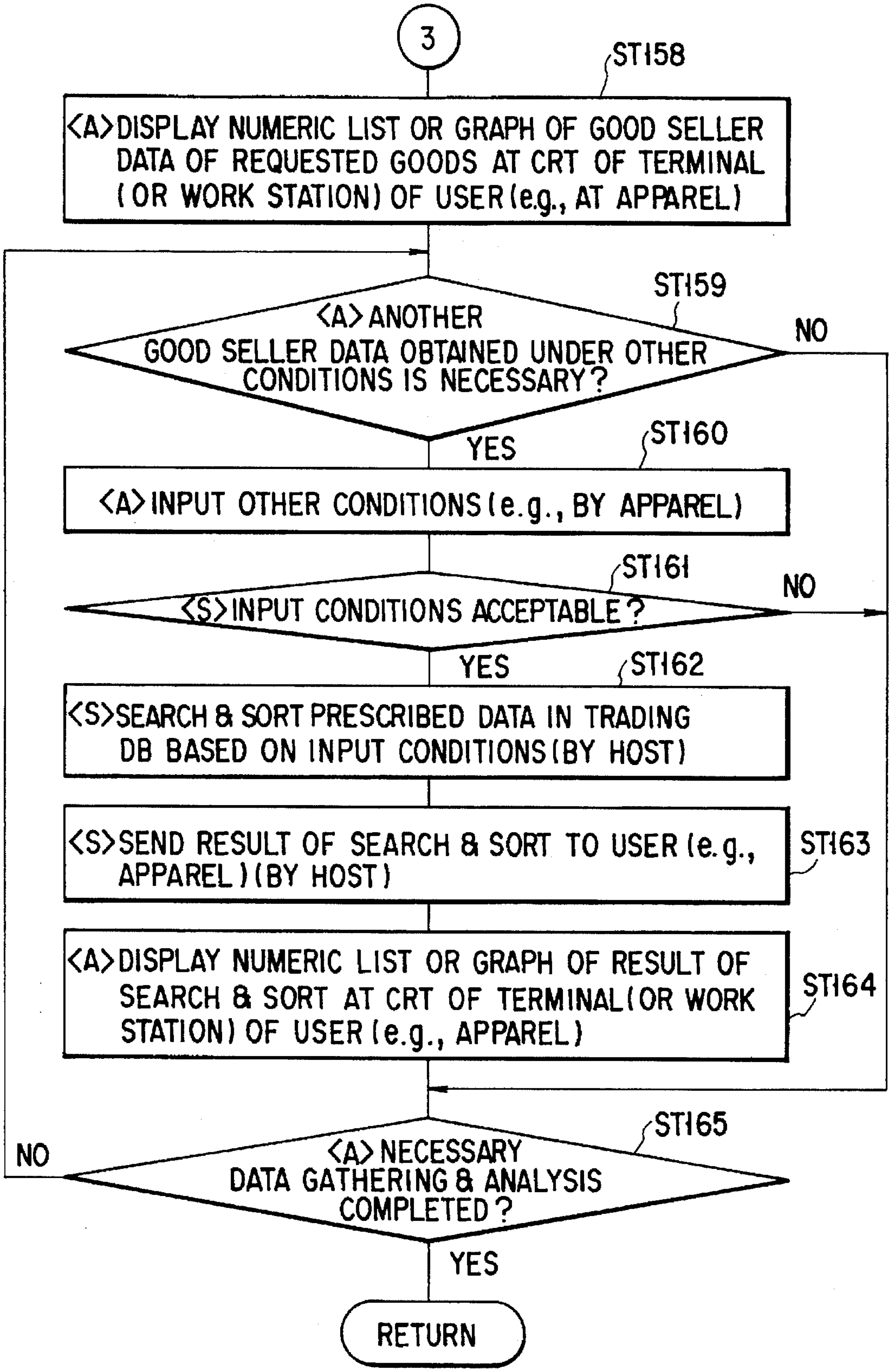
FIG. 13 is a flow chart for explaining the continuation of the sequence in FIG. 12.

FIGS. 12 and 13 are flow charts for explaining periodic good seller detection for finding the good seller.

At twelve midnight, an interruption is generated by a periodic good seller detection request (YES in ST151). When this interruption is generated, host computer 100S calculates an amount of sale (i.e., an amount of sold and a sales volume) for each goods within a given period of time (e.g., Mar. 28 to Mar. 29, 1992) which is predetermined for each goods (ST152). As a result of calculations, the ranks of a given goods represented by a given unity code in the amount of sold and the sales volume are accumulated.

The number of accumulated goods may be very large, and specific goods may be extracted from the accumulation result on the basis of a predetermined management level (ST153). For example, top twenty items ranked in the sales volumes may be listed, or goods sold in an amount of 3 million yen to 10 million yen for two days may be listed. To determine whether a purchase is required, goods sold in an amount of 200,000 yen or less for two days may be listed. (In addition, a sales area for data accumulation or kinds of customers may be specified, as needed.)

The extracted accumulation results (accumulation data for each goods) are sorted in an ascending or descending order, using an amount of sold or an amount of trade as a key item of sorting (ST154). The sorted accumulation data for each goods serve as data representing good sellers at this moment. This good seller data is registered (added or updated) together with the unity code in the DB of auxiliary information of sales in apparel DB 110 (ST155).

Upon the above accumulation, for example, apparel maker "A" (i.e., a user or member of the VAS) sends a good seller data request from its own terminal at 9 o'clock in the next morning. Upon detection of this request (YES in ST156), host computer 100S reads out newest good seller data of the requested goods (past good seller data, if requested) and sends the good seller data of the requested goods to apparel maker "A" (ST157).

The sent good seller data is displayed in the form of, e.g., a table (FIG. 14A) or graph (FIG. 14B) on the terminal screen of apparel maker "A" as the system user (ST158 in FIG. 13). If apparel maker "A" wants good seller data on conditions different from those of the data currently displayed on the terminal screen (YES in ST159), desired conditions (e.g., an accumulation period is changed to one month from March to April, or an accumulation area is changed to the entire domestic market) are input from the terminal (ST160).

If the input conditions are not accepted (e.g., a future accumulation period), a new good seller accumulation cannot be performed (NO in ST161). However, if the input conditions are acceptable (YES in ST161), predetermined data in the DB of auxiliary information of sales are searched and sorted on the basis of the input conditions (ST162). The result of search and sort is sent to the terminal of the user (apparel maker "A") (ST163), and data shown in FIG. 14 is displayed on the terminal screen (ST164).

Figures 14A, 14B:
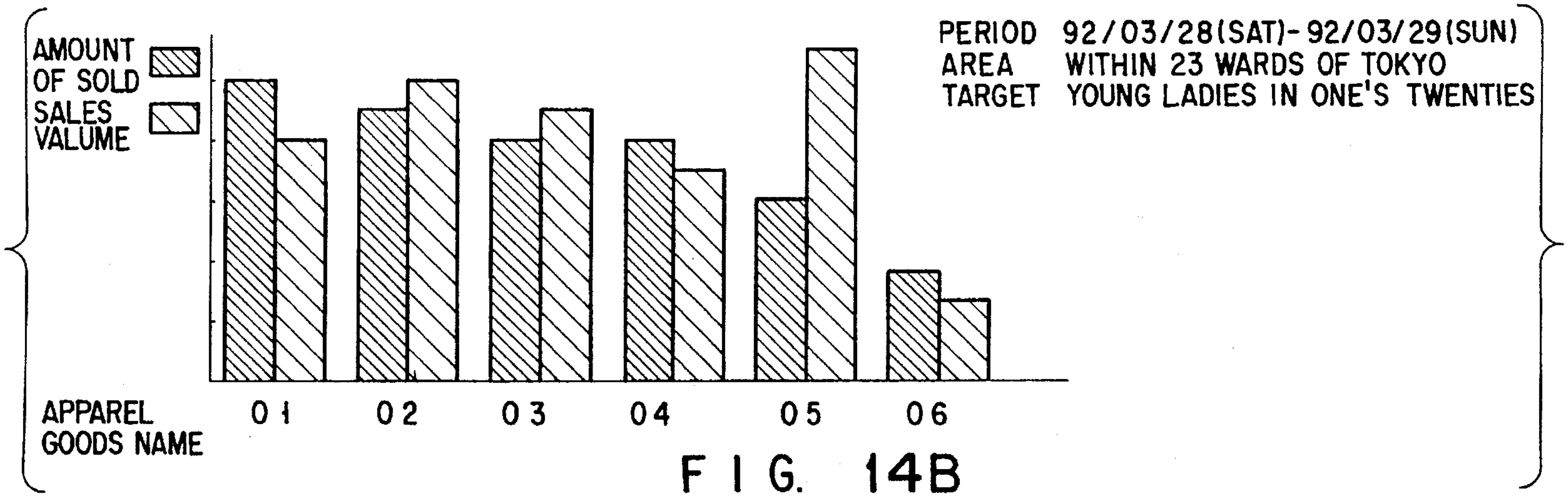
FIGS. 14A and 14B show respective display contents of the periodic good seller detection in FIG. 12.

The following can be read from the graph shown in FIG. 14B. Apparel goods 01 and 02 have large amounts of sold and large sales volumes. Goods 01 has a large amount of sold as compared with its sales volume. This indicates that goods 01 has a higher unit price than that of goods 02 or has a lower discount rate (i.e., a high profit), and that goods 02 also has a large amount of sold. Therefore, goods 01 and 02 are judged as good sellers under the conditions that the data of this graph are accumulated.

Apparel goods 05 has a small amount of sold and a large sales volume. This indicates that this goods 05 is a low-end goods or goods on the bargain. It is thus found that a quality boutique will not handle goods 05 as a new goods. Goods 06 has a small amount of sold and a small sales volume and is regarded as a bad seller.

The graph in FIG. 14B indicates good and bad sellers within a very short period of time, and it is suitable to judge the good/bad sellers from only this graph. In this case, for example, a graph representing the amount of sales of goods 01 to 06 within one month prior to Mar. 27 must be plotted. If the sales volume of goods 06 is kept small or gradually decreased day by day, goods 06 can be Judged as a bad seller. Assume that the sales volume of goods 06 greatly varies depending on the accumulation times. Even if the sales volume of goods 06 is small at a given accumulation timing, Judgment of goods 06 as a bad seller may be an erroneous managing judgment.

To obtain good seller information under other conditions (or other goods) (NO in ST165), the process in steps ST159 to ST164 is repeated. If desired good seller data can be obtained (YES in ST165), the process in FIGS. 12 and 13 is ended.

The above embodiment has mainly exemplified the apparel business world. However, the present invention is also utilized to other information services (e.g., industries of electronic parts, cameras, and bags) other than the apparel business world.

According to the present invention, each member can access a database including his own information and information of a third party. Good sellers can be more accurately predicted, and business almost free from returned goods and a shortage of goods can be achieved. Management of business handling apparel goods (mainly female dresses which soon gain/lose popularity) for a very large number of indefinite women (public consumers) can be improved.

The stock and busy state of any other member (enterprise, company, or individual) as a business fellow in the manufacture of goods can also be detected. Jobs from preparation of a material (textile) required for finishing a goods to the manufacture (sewing) can be efficiently distributed.

Assume that relatively large sewing company "H1" which has daily transactions with apparel maker "A" is busy, and target goods (clothes) cannot be prepared in a desired amount until the due date of apparel maker "A" even when the goods are ordered to sewing company "H1". The information service of the present invention can be offered to apparel maker "A", so that apparel maker "A" can order the goods to, e.g., a plurality of small sewing companies "H2", "H3", "H4", . . . . That is, the delay of goods delivery due to the busy state of a sewing company out of the control of apparel maker "A" can be prevented.

It takes a long period of time (year and half) to prepare for the steps from ordering of materials such as threads and textiles to sewing, although the industry of clothes (particularly, female dresses) has a short sales cycle (2 to 3 months). However, as information can be integrally controlled at the times of the order of materials, design and planning, sewing, and selling, a large time lag can be reduced.

Each user (system member) can use an integration database of his own information and information of a third party to integrally control small-quantity, large-variety goods having a short optimal sales period (seasonal and popular clothes) from the order of row materials (threads and textiles) to the sales of the goods (clothes) (i.e., from the upstream job to the downstream Job in the industry or in the business world). In this manner, the system member can enjoy the information service and can access new information timely. Appropriate personnel can be appointed at appropriate locations, and capitals can be invested at appropriate timings. A time lag from the manufacturing order to the sales can be minimized.

An embodiment of the second invention will be described below. The second invention exemplifies an information service system for an apparel business world, which employs a code conversion system of the present invention.

Figure 31:
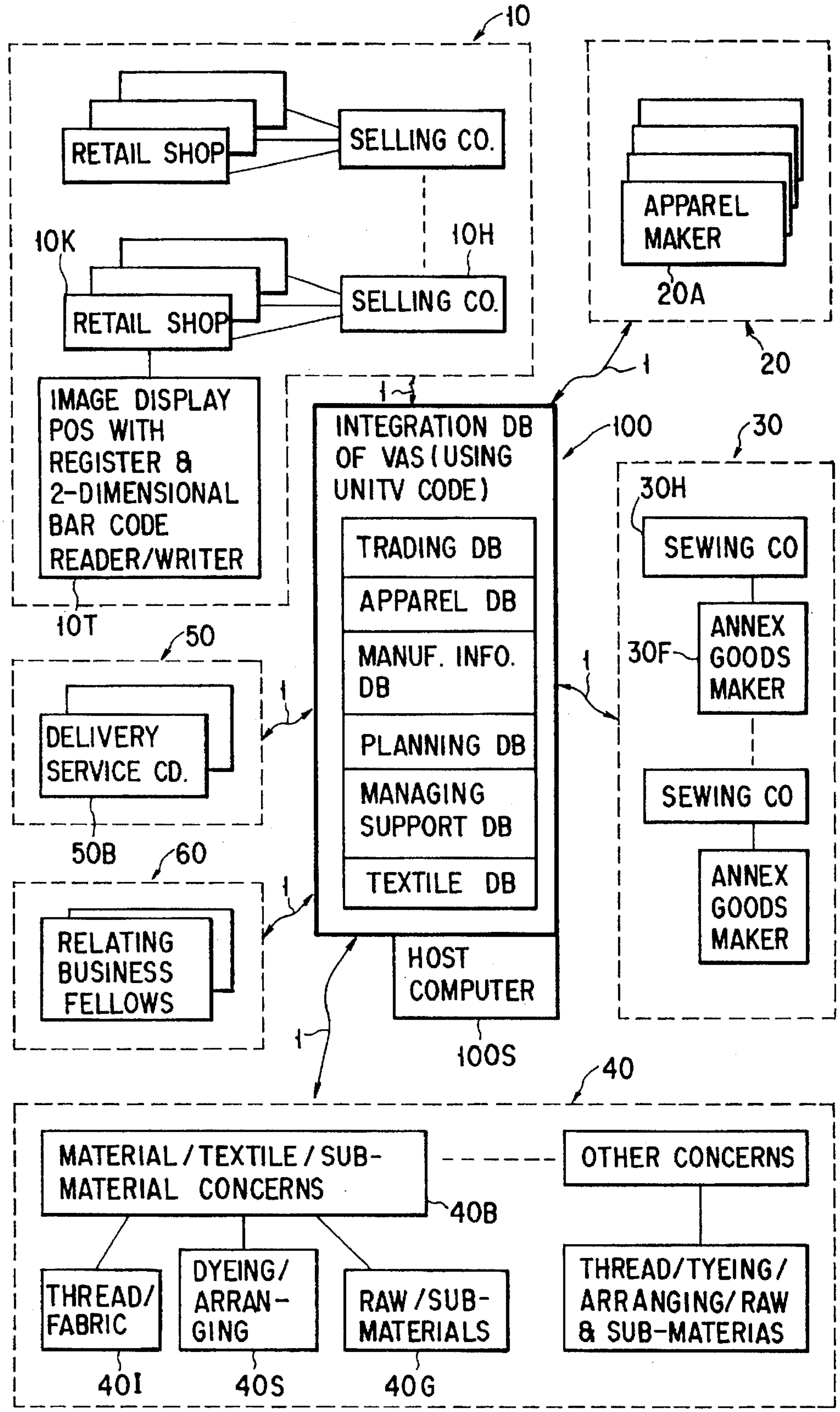
FIG. 31 is a block diagram showing an overall arrangement of an apparel-associated information service system (VAS) which employs the code conversion system of the present invention.

As shown in FIG. 31, the information service system comprises integration database 100 for performing processes using unity codes. Database 100 is controlled by host computer 100S. Database 100 and host computer 100S are operated by an information service company such as a value-added system company (VAS).

A variety of members engaging in the apparel business world have a membership with this VAS. These members use their own terminals leased thereto from the VAS and can access database 100 of the VAS, as needed.

Integration database 100 is connected to selling company group 10, apparel maker group 20, sewing company group 30, material concern group 40, delivery service company group 50, and relating business fellow group 60. Groups 10 to 60 (or groups 10 to 40) are members of the VAS which offers the information service using database 100.

Selling company group 10 is a group of a plurality of independent selling companies 10H and shops (e.g., boutiques) 10K. Companies 10H and shops 10K run business using their own shop goods codes. Each shop 10K has terminal 10T which communicates with database 100.

Terminal 10T of each shop 10K has a basic function of accessing integration database 100 to receive various information services from the VAS. Terminal 10T also has a POS (point of sales) function, a register function, and a one- or two-dimensional bar code read/write function so as to directly enter trading (business showing) information of its own. This terminal 10T has a bit map image display apparatus as in a GUI (graphic user interface)-based personal computer. For this reason, terminal 10T can process character information and image information. An operator of this terminal 10T can appropriately utilize the POS function, the register function, and the bar code processing function while observing image information of goods handled in shop 10K.

Apparel maker group 20 is a group of a plurality of independent apparel makers 20A. These apparel makers 20A run business using their own apparel goods codes. Each apparel maker 20A has an image display terminal (not shown) similar to that of shop 10K. (Note that apparel makers 20A and selling companies 10H may be affiliated companies.)

Sewing company Group 30 is a group of a plurality of independent sewing companies 30H. These sewing companies 30H range from a large company which runs large business using its own Goods codes to a small company employing several sewers without using its own goods codes. (When a small sewing company having no goods codes accesses the VAS, it uses the unity codes of the VAS.) These sewing companies 30H have business transactions with makers 30F handling annex goods (e.g., buttons and fasteners) required for sewing. Although not shown, each sewing company 30H can have an image display terminal similar to that in shop 10K. (Note that the terminal of the sewing company need not have POS and register functions.)

Material concern group 40 is a group of companies for manufacturing various textiles, i.e., a group of material/textile/sub-material companies 40B, thread/fabric companies 40I, dyeing/arranging companies 40S, raw material/sub-material companies 40G. Material concern group 40 may be constituted by specialized organizations or a single enterprise. Although not shown, each company 40B can have an image display terminal. (This terminal need not have the POS and register functions.)

Delivery service group 50 is constituted by at least one delivery service company (transport company) 50B for transporting goods (or materials) between members 10, 20, 30, and 40. Relating business fellow group 60 includes management consultants, accountants, advertizing companies, goods planners, trend watchers, and the like.

Delivery service group 50 and/or relating business fellow group 60 may be affiliated under the VAS which operates database 100. Although not shown, each delivery service company or each relating business fellow can have an image display terminal.

Note that delivery service companies 50B and relating business fellows 60 as the members of the VAS must have character-based terminals to access database 100 if they do not have image display terminals.

Integration database 100 comprises a trading database (trading or business showing DB) for storing trading condition/business showing information between a consumer and each retail shop and between members 10, 20, 30, and 40, an apparel database (apparel DB) for storing various kinds of information of new and old goods produced by apparel maker group 20, a manufacturing information database (manuf. info. DB) for storing information representing steps from the material order to sewing, a planning information database (planning DB) for storing information of planning of new goods to be sold, a managing support database (managing support DB) for storing information associated with management support of members 10 to 60, and a textile database (textile DB) for storing information of textiles used as those for goods.

The apparel DB stores the following pieces of information associated with goods handled by apparel makers 20A.

1) Goods Information (the same as in the example of FIG. 1)

2) Textile Information (the same as in the example of FIG. 1)

3) Business Showing Information (the same as in the example of FIG. 1)

4) Manufacturing Information (the same as in the example of FIG. 1)

5) Image Information (the same as in the example of FIG. 1)

6) Stock Information (Auxiliary Information of Sales) (the same as in the example of FIG. 1)

7) Code Master for Goods

The code master for goods is a list including goods codes of each retail shop and the corresponding unity codes. (A file of a code conversion table to be described later with reference to FIGS. 25A to 25C or the like can be handled as part of the code master for goods.)

Figure 21A:
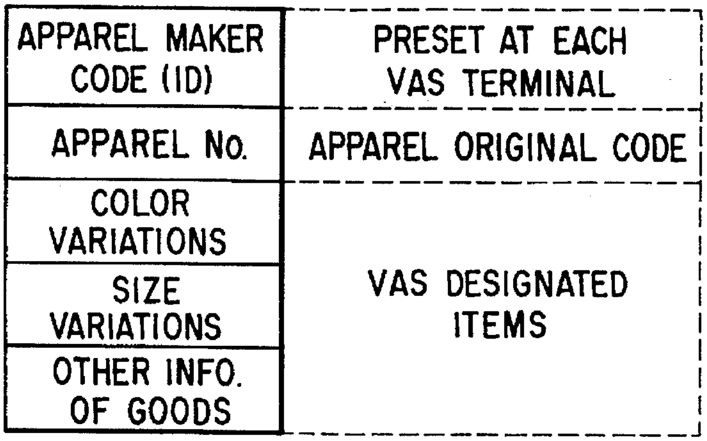
FIGS. 21A to 21C are views showing a code format including a goods classification code used for apparel goods by an apparel maker, a code format including a unity code formed in correspondence with the goods classification code of the apparel maker, and a code format including the unity code to which a shop goods code used by a retail shop is linked, respectively.
Figure 21B:
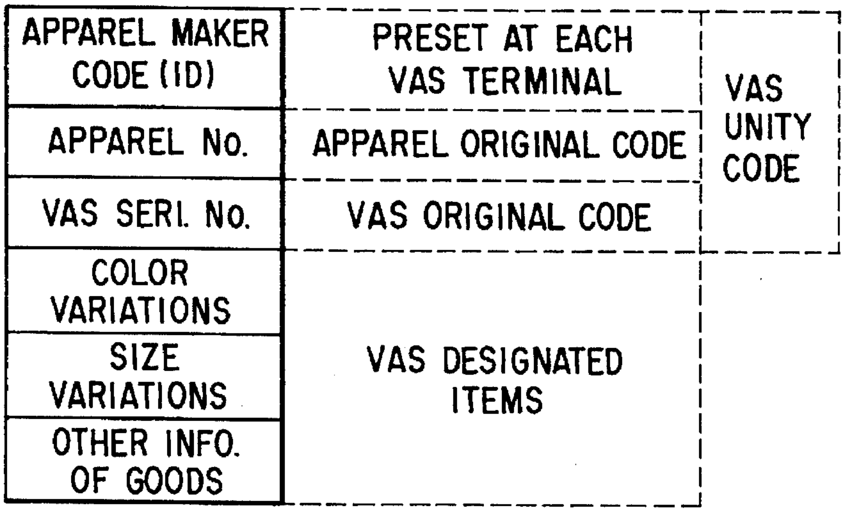
Figure 21C:
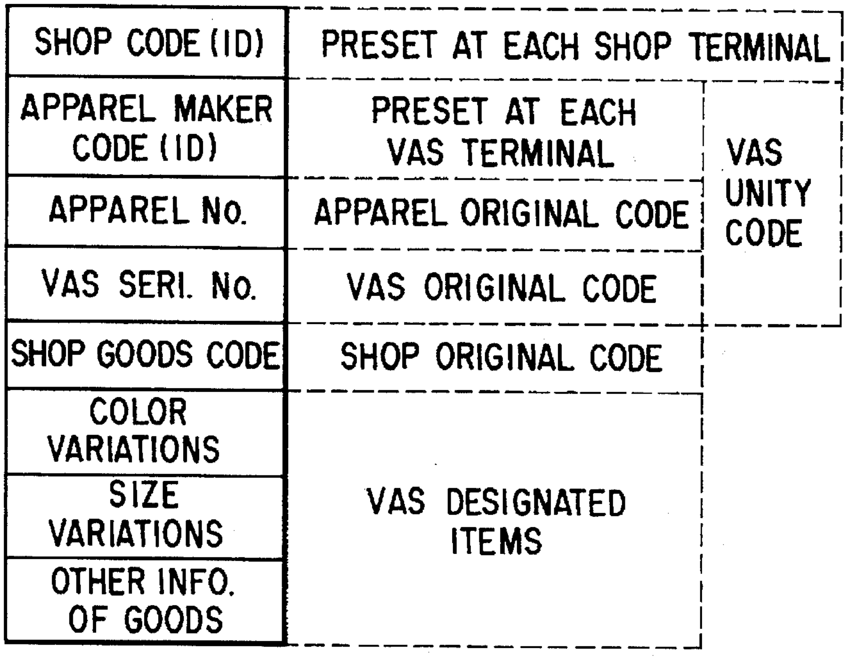

FIGS. 21A to 21C show a code format including a goods classification code used for apparel goods by an apparel maker, a code format including a unity code formed in correspondence with the goods classification code of the apparel maker, and a code format including the unity code to which a shop goods code used by a retail shop is linked, respectively.

Assume that apparel maker 20A as a VAS member classifies its own goods in accordance with its own apparel number, and that apparel maker 20A access the VAS to register its own goods.

The code format used in this access is shown in FIG. 21A. This code format is constituted by an apparel maker code (ID assigned to a VAS member) already assigned to the terminal of apparel maker 20A, an apparel number used for a goods to be registered by apparel maker 20A, colors available if this goods has a plurality of color variations, sizes available if this goods has a plurality of size variations, and contents of other information available if this goods has such information. Note that the color variations, size variations, and other information are designated by the VAS. The columns of these items may be kept blanked.

The apparel number is input from a terminal keyboard by a terminal operation of apparel maker 20A or is read out from a local database (installed in the terminal) of apparel maker 20A. The apparel maker code (apparel ID) is preset in the terminal of apparel maker 20A. When an operator accesses the VAS at this terminal, the apparel ID is automatically added to the code format in FIG. 21A.

When the VAS is accessed with the code format in FIG. 21A, host computer 100S of the VAS automatically adds sub-numbers corresponding to the number of combinations of the color variations, the size variations, and other information to the apparel number.

The code format obtained upon accessing the VAS with the code format in FIG. 21A is shown in FIG. 21B.

The code format in FIG. 21B is constituted by the apparel ID of apparel maker 20A, an apparel number used for a goods to be registered by apparel maker 20A, subnumbers corresponding to the number of combinations of the color/size/other information of the goods (i.e., VAS original serial numbers), and the contents of the color/size/other information. Note that the apparel number used in the VAS need not be the code actually used by the apparel maker and may be a VAS original code corresponding to this goods.

As can be apparent from the comparison between the code formats in FIGS. 21A and 21B, the VAS code format can perform a finer classification than that of the code format of the apparel maker by "VAS serial numbers". In this embodiment, the VAS code format has a higher management level for the same goods than that of the apparel maker (i.e., the way of classifying the goods is finer).

In the format in FIG. 21B, a combination of the apparel maker ID, the apparel number, and the VAS serial number is handled as a VAS unity code. When the contents of the correlation (FIGS. 21B) of the apparel maker ID, the apparel number, the VAS serial number, and the unity code is utilized to arrange a code conversion table, the goods can be specified by the unity code. In the same manner as in use of the unity code, the apparel maker which has registered this goods can use the apparel original code (apparel number) to specify the goods registered in the VAS. (A detailed arrangement of a code conversion table will be described later.)

When registration of the goods with the code format shown in FIG. 21B is completed, this goods can be disclosed to all VAS members in principle. (Note that only specific goods of new goods which are not yet introduced to the public can be accessed using passwords.)

Assume that given shop 10K searches goods in the VAS apparel DB (FIG. 31) at its own terminal 10T to find a registered goods (disclosed to the public) of apparel maker 20A. When shop 10K downloads the goods information to its own terminal 10T, the goods information together with information shown in FIG. 21B is downloaded to terminal 10T.

If shop 10K Judges to handle this goods, the shop goods code used for this goods by shop 10K is input from the terminal of shop 10K, the shop goods code is added to the information shown in FIG. 21B. The information added with the shop goods code is sent back to the VAS. An identification code (ID) of the retail shop which is assigned to terminal 10T in advance is automatically added, thereby obtaining a code format shown in FIG. 21C.

As can be apparent from comparison between the code formats in FIGS. 21B and 21C, the code format of the retail shop can be finer classified than the VAS code format by the "shop goods code". In this embodiment, the code format of the retail shop has a higher management level for the same goods than that of the VAS code format (i.e., the way of classifying the goods is finer). (Note that the VAS code format may have a higher management level than the shop code format, and a detailed case will be described later.)

In this embodiment, when the format (FIG. 21C) representing a correlation of the retail shop ID, the VAS unity code, and the shop goods code is utilized to form a code conversion table, the goods can be specified with the unity code. In the same manner as in use of the unity code, the retail shop can use the shop goods code to specify the goods registered in the VAS.

FIGS. 22A to 22C show code formats when the management level of the unity code is higher than that of the goods classification code of the apparel maker and the management level of the shop goods code is higher than that of the unity code.

As shown in FIG. 22A, assume that apparel maker 20A of ID=A001 registers blouses having an apparel number of 10301 in the VAS. In this case, only one apparel number is used. However, in actual goods, the number of color variations is two (blue and white), the number of size variations is one (No. 9), and the number of other information is two (the presence/absence of buttons).

When the "blouse" is registered in the VAS through the terminal of apparel maker 20A, an independent file including a code Conversion table corresponding to the contents of FIG. 22B is generated in the apparel DB in integration database 100 (corresponding to FIGS. 25A to 25C to be described later). In generation of this code conversion table file, a unity code is generated for a blue, No. 9 blouse having an apparel code of A001, an apparel number of 10301, and no buttons.

Assume that a code used for the classification of goods as "blouse" is given by the VAS as 24305 regardless of the VAS members. In this case, the apparel number of 10301 of the blouse to be registered is replaced with 24305. The apparel code of A001 is added to the beginning of the VAS code of 24305, and the serial number of 001 corresponding to the combination of color variations/size variations/other information is added to the end of the resultant code. Therefore, a unity code of A00124305001 is generated for the "blue, No. 9 blouse without buttons".

Similarly, a unity code of A00124305002 (serial number of 002) is generated for a "white, No. 9 blouse having an apparel code of A001, an apparel number of 10301, and no buttons". A unity code of A00124305003 (serial number of 003) is generated for a "blue, No. 9 blouse having an apparel code of A001, an apparel number of 10301, and buttons". A unity code of A00124305004 (serial number of 004) is generated for a "white, No. 9 blouse having an apparel code of A001, an apparel number of 10301, and buttons".

The code conversion table file generated as described above serves as a conversion table between the apparel goods management code (10301) of the apparel maker of ID=A001 which has a relatively low management level and the VAS unity codes (A00124305001 to A00124305004) having a relatively high management level.

When apparel maker 20A of ID=A001 accesses the VAS in FIG. 31, using the apparel number of 10301 as a keyword, VAS host computer 100S looks up the conversion table file to read out the data file (blouse information of the apparel number of 10301) specified by the unity codes of A00124305001 to A00124305004 from the apparel DB of integration database 100. This apparel number of 10301 cannot distinguish color variations/other information (i.e., the management level is low). However, when the VAS unity code is used, the color variations/other information of the "blouses" corresponding to the apparel number of 10301 can be distinguished (the management level is high).

When the "blouses" having the apparel number of 10301 are registered in the VAS, host computer 100S automatically generates an independent file including the code conversion table having the contents shown in FIG. 22B in the apparel DB in integration database 100.

The code "24305" used by the VAS for the classification of goods as the "blouse" is predetermined. For this reason, when a member enters a keyword as "blouse" from his own terminal, this input is converted into the code "24305" which serves as the search keyword of the apparel DB in integration database 100. (When a coarse search without any conditions other than the classification of goods as the "blouse" is performed, code "24305" is used as a keyword of the search wild card.)

Assume that shop 10K having a shop code of K010 searches various "blouses" registered in integration database 100 from its own terminal 10T (a search keyword is "24305" in the system) and pays attention to the registered goods of apparel maker 20A. The target goods have unity codes (A00124305001 to A00124305004), so that the goods are selected from the list on the display screen of terminal 10T. The corresponding goods information is downloaded to terminal 10T, and the downloaded information includes the unity codes (A00124305001 to A00124305004).

Assume that a person in charge who operates terminal 10T at shop 10K selects the "blue and white blouses of the apparel maker of A001 (unity codes of A00124305001 to A00124305004)" on the basis of the information displayed on the CRT screen of terminal 10T, and that the person in charge wants blouse samples. In this case, the person in charge at shop 10K enters shop goods codes (43151 to 43154) from terminal 10T for each sample (i.e., a blue, No.

9 blouse having no buttons; a white, No. 9 blouse having no buttons; a blue, No. 9 blouse having buttons; and a white, No. 9 blouse having buttons). In addition, if a special-order blouse using special buttons is included in the white, No. 9 blouses, the corresponding shop goods code (43154S) is input from terminal 10T. A correspondence between the VAS unity codes of the goods for samples and the shop goods codes of shop 10K of the goods for samples is determined, as shown in FIG. 22C. (If shop 10K does not have shop goods codes of these goods, the VAS unity codes are used to specify these goods. In this case, the unity codes need not be entered one by one. The items of the target goods displayed on the terminal screen can be selected with a keyboard or mouse.)

When the code correspondence shown in FIG. 22C is used to form a code conversion table, the unity codes (A00124305001 to A00124305004) are used to specify the corresponding goods (the blouses of the apparel number of 10301). In addition, in the same manner as in use of the unity codes, the person in charge at shop 10K can use the shop goods codes (43151 to 43154 and 43154S) to specify the goods registered in the VAS.

When shop 10K of ID=K010 accesses the VAS of FIG. 31, using the shop goods code of 43151 as a keyword, VAS host computer 100S looks up the conversion table file in FIG. 22C to read out the data file (information of the blue, No. 9 blouse having the apparel number of 10301 and no buttons) specified by the unity code of A00124305001 from the apparel DB of integration database 100.

Similarly, when shop 10K of ID=K010 accesses the VAS in FIG. 31, using the shop goods codes of 43152 to 43154 as the keywords, VAS host computer 100S looks up the conventional table file in FIG. 22C to read out (information of the blue/white, No. 9 blouses, with/without buttons, having the apparel number of 10301) specified by the unity codes of A00124305002 to A00124305004 from the apparel DB of integration database 100.

When shop 10K of ID=K010 accesses the VAS in FIG. 31, using a shop goods code of 43154S as a keyword, VAS host computer 100S looks up the conversion table file in FIG. 22C to read out the data file (information of the white, No. 9 blouse having the apparel number of 10301 and buttons) specified by the unity code of A00124305004 from the apparel DB of integration database 100. In this case, VAS unity code does not specify the special-order buttons (the management level of the shop code format of shop of ID=K010 is higher than that of the VAS code format). For this reason, even if the shop goods code is either 43154 or 43154S, information of the blouses having the unity code of A00124305004 can be read out from the apparel DB of integration database 100.

A ratio of the management level of the apparel maker to that of the VAS is 1 : 4 (1 : m) in the code formats of FIGS. 22A and 22B. A ratio of the management level of the VAS to that of the retail shop is 4 : 5=1 : 5/4 (1 : n) in the code formats of FIGS. 22B and 22C. Even if these differences in management levels are present, the conversion tables shown in FIGS. 22A to 22C are looked up to specify a predetermined goods in accordance with the code system of the corresponding management level.

FIGS. 23A to 23C show code formats when the management level of the unity code is higher than the goods classification code of the apparel maker and the management level of the shop goods code is lower than that of the unity code.

As shown in FIG. 23A, assume that apparel maker 20A of ID=A002 registers coats having an apparel number of 13579 in the VAS. In this case, only one apparel number is used. However, in actual goods, the number of color variations is two (black and white), the number of size variations is two (Nos. 8 and 9), and the number of other information is two (natural fur/synthetic fur).

When the "coat" is registered in the VAS through the terminal of apparel maker 20A, an independent file including a code conversion table corresponding to the contents of FIG. 23B is generated in the apparel DB in integration database 100. In generation of this code conversion table file, a unity code is generated for a black, No. 8 fur coat having an apparel code of A002, an apparel number of 13579.

Assume that a code used for the classification of goods as "coat" is given by the VAS as 24680 regardless of the VAS members. In this case, the apparel number of 13579 of the coat to be registered is replaced with 24680. The apparel code of A002 is added to the beginning of the VAS code of 24680, and the serial number of 001 corresponding to the combination of color variations/size variations/other information is added to the end of the resultant code. Therefore, a unity code of A00224680001 is generated for the "black, No. 8 synthetic fur coat".

Similarly, a unity code of A00224680002 (serial number of 002) is generated for a "black, No. 9 synthetic fur coat having an apparel code of A002 and an apparel number of 13579". A unity code of A00224680003 (serial number of 003) is generated for a "white, No. 8 synthetic fur coat having an apparel code of A002 and an apparel number of 13579". A unity code of A00224680004 (serial number of 004) is generated for a "white, No. 9 synthetic fur coat having an apparel code of A002 and an apparel number of 13579". A unity code of A00224680005 (serial number of 005) is generated for a "white, No. 8 natural fur coat having an apparel code of A002 and an apparel number of 13579". (In this case, a No. 9 natural fur coat is not available.)

The code conversion table file generated as described above serves as a conversion table between the apparel goods management code (13579) of the apparel maker of ID=A002 which has a relatively low management level and the VAS unity codes (A00224680001 to A00224680005) having a relatively high management level.

When apparel maker 20A of ID=A002 accesses the VAS in FIG. 31, using the apparel number of 13579 as a keyword, VAS host computer 100S looks up the conversion table file to read out the data file (coat information of the apparel number of 13579) specified by the unity codes of A00224680001 to A00224680005 from the apparel DB of integration database 100. This apparel number of 13579 cannot distinguish color variations/other information (i.e., the management level is low). However, when the VAS unity code is used, the color variations/other information of the "coats" corresponding to the apparel number of 13579 can be distinguished (the management level is high).

When the "coats" having the apparel number of 13579 are registered in the VAS, host computer 100S automatically generates an independent file including the code conversion table having the contents shown in FIG. 23B in the apparel DB in integration database 100.

The code "24680" used by the VAS for the classification of goods as the "coat" is predetermined. For this reason, when a member enters a keyword as "coat" from his own terminal, this input is converted into the code "24680" which serves as the search keyword of the apparel DB in integration database 100.

Assume that shop 10K having a shop code of K100 searches various "coats" registered in integration database 100 from its own terminal 10T (a search keyword is "24680" in the system) and pays attention to the registered goods of apparel maker 20A. The target goods have unity codes (A00224680001 to A00224680005), so that the goods are selected from the list on the display screen of terminal 10T. The corresponding goods information is downloaded to terminal 10T, and the downloaded information includes the unity codes (A00224680001 to A00224680005).

Assume that a person in charge who operates terminal 10T at shop 10K selects the "black and white coats of the apparel maker of A002 (unity codes of A00224680001 to A00224680005)" on the basis of the information displayed on the CRT screen of terminal 10T, and that the person in charge wants coat samples. In this case, the person in charge at shop 10K enters shop goods codes (029 and 129) from terminal 10T for each sample (i.e., black and white coats (unity codes of A00224680001 to A00224680005)). A correspondence between the VAS unity codes of the goods for samples and the shop goods codes of shop 10K of the goods for samples is determined, as shown in FIG. 23C.

When the code correspondence shown in FIG. 23C is used to form a code conversion table, the unity codes (A00224680001 to A00224680005) are used to specify the corresponding goods (the coats of the apparel number of 13579). In addition, in the same manner as in use of the unity codes, the person in charge at shop 10K can use the shop goods code (029 or 129) to specify the goods registered in the VAS.

When shop 10K of ID=K100 accesses the VAS of FIG. 31, using the shop goods code of 029 as a keyword, VAS host computer 100S looks up the conversion table file in FIG. 23C to read out the data file (information of the black/white, Nos. 8 and 9 synthetic fur coats having the apparel number of 13579) specified by the unity codes of A00224680001 to A00224680004 from the apparel DB of integration database 100.

When shop 10K of ID=K100 accesses the VAS in FIG. 31, using a shop goods code of 129 as a keyword, VAS host computer 100S looks up the conversion table file in FIG. 23C to read out the data file (information of the white, No. 8 natural fur coat having the apparel number of 13579) specified by the unity code of A00224680005 from the apparel DB of integration database 100.

A ratio of the management level of the apparel maker to that of the VAS is 1 : 5 (1 : m) in the code formats of FIGS. 23A and 23B. A ratio of the management level of the VAS to that of the retail shop is 5 : 2=1 : 5/2 : 1 (n : 1) in the code formats of FIGS. 23B and 23C. Even if these differences in management levels are present, the conversion tables shown in FIGS. 23A to 23C are looked up to specify a predetermined goods in accordance with the code system of the corresponding management level.

FIGS. 24A to 24C are views showing code formats when the management level of the unity code is higher than that of the goods classification code of the apparel maker and the management level of the shop goods code is equal to that of the unity code.

As shown in FIG. 24A, assume that apparel maker 20A of ID=A003 registers dresses having an apparel number of 84625 in the VAS. In this case, only one apparel number is used. However, in actual goods, the number of color variations is one (white), the number of size variations is one (Nos. 7 and 8), and the number of other information is two (brand 1/brand 2).

When the "dress" is registered in the VAS through the terminal of apparel maker 20A, an independent file including a code conversion table corresponding to the contents of FIG. 24B is generated in the apparel DB in integration database 100. In generation of this code conversion table file, a unity code is generated for a white, No. 7 dress of brand 1 having an apparel code of A003 and an apparel number of 84625.

Assume that a code used for the classification of goods as "dress" is given by the VAS as 42312 regardless of the VAS members. In this case, the apparel number of 84625 of the dress to be registered is replaced with 42312. The apparel code of A003 is added to the beginning of the VAS code of 42312, and the serial number of 001 corresponding to the combination of color variations/size variations/other information is added to the end of the resultant code. Therefore, a unity code of A00342312001 is generated for the "white, No. 7 dress of brand 1".

Similarly, a unity code of A00342312002 (serial number of 002) is generated for a "white, No. 8 dress of brand 1 having an apparel code of A003 and an apparel number of 84625". A unity code of A00342312003 (serial number of 003) is generated for a "white, No. 7 dress of brand 2 having an apparel code of A003 and an apparel number of 84625". A unity code of A00342312004 (serial number of 004) is generated for a "white, No. 8 dress of brand 2 having an apparel code of A003 and an apparel number of 84625".

The code conversion table file generated as described above serves as a conversion table between the apparel goods management code (84625) of the apparel maker of ID=A003 which has a relatively low management level and the VAS unity codes (A00342312001 to A00342312004) having a relatively high management level.

When apparel maker 20A of ID=A003 accesses the VAS in FIG. 31, using the apparel number of 84625 as a keyword, VAS host computer 100S looks up the conversion table file to read out the data file (dress information of the apparel number of 84625) specified by the unity codes of A00342312001 to A00342312004 from the apparel DB of integration database 100. This apparel number of 84625 cannot distinguish color variations/other information (i.e., the management level is low). However, when the VAS unity code is used, the color variations/ other information of the "dresses" corresponding to the apparel number of 84625 can be distinguished (the management level is high).

When the "dresses" having the apparel number of 84625 are registered in the VAS, host computer 100S automatically generates an independent file including the code conversion table having the contents shown in FIG. 24B in the apparel DB in integration database 100.

The code "42312" used by the VAS for the classification of goods as the "dress" is predetermined. For this reason, when a member enters a keyword as "dress" from his own terminal, this input is converted into the code "42312" which serves as the search keyword of the apparel DB in integration database 100.

Assume that shop 10K having a shop code of K321 searches various "dresses" registered in integration database 100 from its own terminal 10T (a search keyword is "42312" in the system) and pays attention to the registered goods of apparel maker 20A. The target goods have unity codes (A00342312001 to A00342312004), so that the goods are selected from the list on the display screen of terminal 10T. The corresponding goods information is downloaded to terminal 10T, and the downloaded information includes the unity codes (A00342312001 to A00342312004).

Assume that a person in charge who operates terminal 10T at shop 10K selects the "white dresses of the apparel maker of A003 (unity codes of A00342312001 to A00342312004)" on the basis of the information displayed on the CRT screen of terminal 10T, and that the person in charge wants dress samples. In this case, the person in charge at shop 10K enters shop goods codes (DW171, DW181, DW271, and DW281) from terminal 10T for each sample. A correspondence between the VAS unity codes of the goods for samples and the shop goods codes of shop 10K of the goods for samples is determined, as shown in FIG. 24C.

When the code correspondence shown in FIG. 24C is used to form a code conversion table, the unity codes (A00342312001 to A00342312004) are used to specify the corresponding goods (the dresses of the apparel number of 84625). In addition, in the same manner as in use of the unity codes, the person in charge at shop 10K can use the shop goods code (DW171, DW271, or DW281) to specify the goods registered in the VAS.

When shop 10K of ID=K321 accesses the VAS of FIG. 31, using the shop goods code of DW171 as a keyword, VAS host computer 100S looks up the conversion table file in FIG. 24C to read out the data file (information of the white, No. 7 dress of brand 1 having the apparel number of 84625) specified by the unity code of A00342312001 from the apparel DB of integration database 100.

Similarly, when shop 10K of ID=K321 accesses the VAS in FIG. 31, using a shop goods code of DW281 as a keyword, VAS host computer 100S looks up the conversion table file in FIG. 24C to read out the data file (information of the white, No. 8 dress of brand 2 having the apparel number of 84625) specified by the unity code of A00342312004 from the apparel DB of integration database 100.

A ratio of the management level of the apparel maker to that of the VAS is 1 : 4 (1 : m) in the code formats of FIGS. 24A and 24B. A ratio of the management level of the VAS to that of the retail shop is 4 : 4 (1 : 1) in the code formats of FIGS. 24B and 24C. Even if these differences in management levels are present, the conversion tables shown in FIGS. 24A to 24C are looked up to specify a predetermined goods in accordance with the code system of the corresponding management level.

FIGS. 25A to 25C are code conversion tables obtained when retail shops access the goods registered from the apparel makers to integration database 100. An apparel ID is assigned to xxx at the start of a unity code in the corresponding column, and a VAS serial number is assigned to xxx at the end of a unit code in the column.

Referring to FIG. 25A, the goods (blouse) having the apparel number of 10301 is registered from the apparel maker having the ID of A001 in the classification of goods "blouse" in the apparel DB in the VAS, and a code conversion table accessed for the registered goods by a plurality of retail shops is illustrated (see FIGS. 22A to 22C).

In this case, two retail shops (ID=K010 and K020) access (request for trading) the same goods (apparel number: 10301; VAS serial number: 001), and two shop goods codes (43151 and B039) are linked to this goods. Another goods (apparel number: 10301; VAS serial number: 002) is also accessed. As a result, the shop goods code (43152) of the retail shop of ID=K010 is linked to this goods.

Referring to the conversion table in FIG. 25A, the goods (blue, No. 9 blouse without buttons) represented by the unity code of A00124305001 (xxx24305xxx) in the left column in FIG. 25A) can be specified by a member code of 10301 of ID=A001, 43151 of ID=K010, or B039 of ID=K020.

Similarly, when this conversion table is looked up, the goods (white No. 9 blouse without buttons) represented by the unity code of A00124305002 (xxx24305xxx in the right column in FIG. 25A) can be specified by the member code of 10301 of ID=A001 or 43152 of ID=K010.

The management level of the VAS is higher than other management levels, so that the goods (blue, No. 9 blouse without buttons) represented by the unity code of A00124305001 (xxx24305xxx in the left and central columns in FIG. 25A) can be specified by a plurality of shop goods codes (43151 and B039). That is, the unity code corresponds to the shop good codes at a ratio of 1 : n.

Referring to FIG. 25B, the goods (coat) having the apparel number of 13579 is registered from the apparel maker of ID=A002 in the classification of goods "coat" in the apparel DB in the VAS, and a code conversion table obtained by accessing this registered goods by a plurality of retail shops is illustrated (FIGS. 23A to 23C).

In this case, two retail shops (ID=K100 and K200) access (request for trading) the same goods (apparel number: 13579; VAS serial number: 003), and two shop goods codes (029 and C040) are linked to this goods. Another goods (apparel number: 13579; VAS serial number: 001) is also accessed. As a result, the shop goods code (029) of the retail shop of ID=K100 is linked to this goods.

Referring to the conversion table in FIG. 25B, the goods (white, No. 8 synthetic fur coat) represented by the unity code of A00224608003 (xxx24608xxx in the right column in FIG. 25B) can be specified by a member code of 13579 of ID=A002, 029 of ID=K100, or C040 of ID=K200.

The management level of the retail shop of ID=K100 is lower than other management levels, so that the member code of 029 of ID=K100 can also specify the goods (black, No. 8 synthetic fur coat) represented by the unity code of A00224608001 (xxx24608xxx in the left column in FIG. 25B). That is, the unity code corresponds to the shop good codes at a ratio of n : 1.

Referring to FIG. 25C, the goods (dress) having the apparel number of 84625 is registered from the apparel maker of ID=A003 in the classification of goods (dress) in the apparel DB of the VAS, a goods (dress) having an apparel number of D333 is registered from an apparel maker of ID=A011 to the VAS, a goods (dress) having an apparel number of 951 is registered from an apparel maker of ID=A022 to the VAS, and a code conversion table obtained by assessing these goods by a plurality of retail shops is illustrated (FIGS. 24A to 24C).

In this case, the retail shop of ID=K321 accesses the goods (apparel number: 84625; VAS serial number: 003), and the shop goods code of DW271 is linked to this goods. A retail shop of ID=K456 accesses the goods (apparel number: D333; VAS serial number: 001), and a shop goods code of S741 is linked to this goods. A retail shop of ID=K987 accesses the goods (apparel number: 951: VAS serial number: 002), and a shop goods code of P963 is linked to this goods.

When the conversion table in FIG. 25C is looked up, the goods (white, No. 7 dress of brand 2) represented by the unity code of A00342312003 (xxx42312xxx in the left column in FIG. 25C) can be specified by the member code of 84625 of ID=A003 or DW271 of ID=K321. Similarly, the goods (dress) represented by the unity code of A01142312001 (xxx42312xxx in the central column in FIG. 25C) can be specified by the member code of D333 of ID=A011 or S741 of ID=K456. The goods (dress) represented by the unity code of A02242312002 (xxx42312xxx in the right column in FIG. 25C) can be specified by the member code of 951 of ID=A022 or P963 of ID=K987.

In this case, the management level of the VAS is equal to that of the retail shops, so that the unity code corresponds to the shop goods code at a ratio of 1 : 1.

Figure 26:
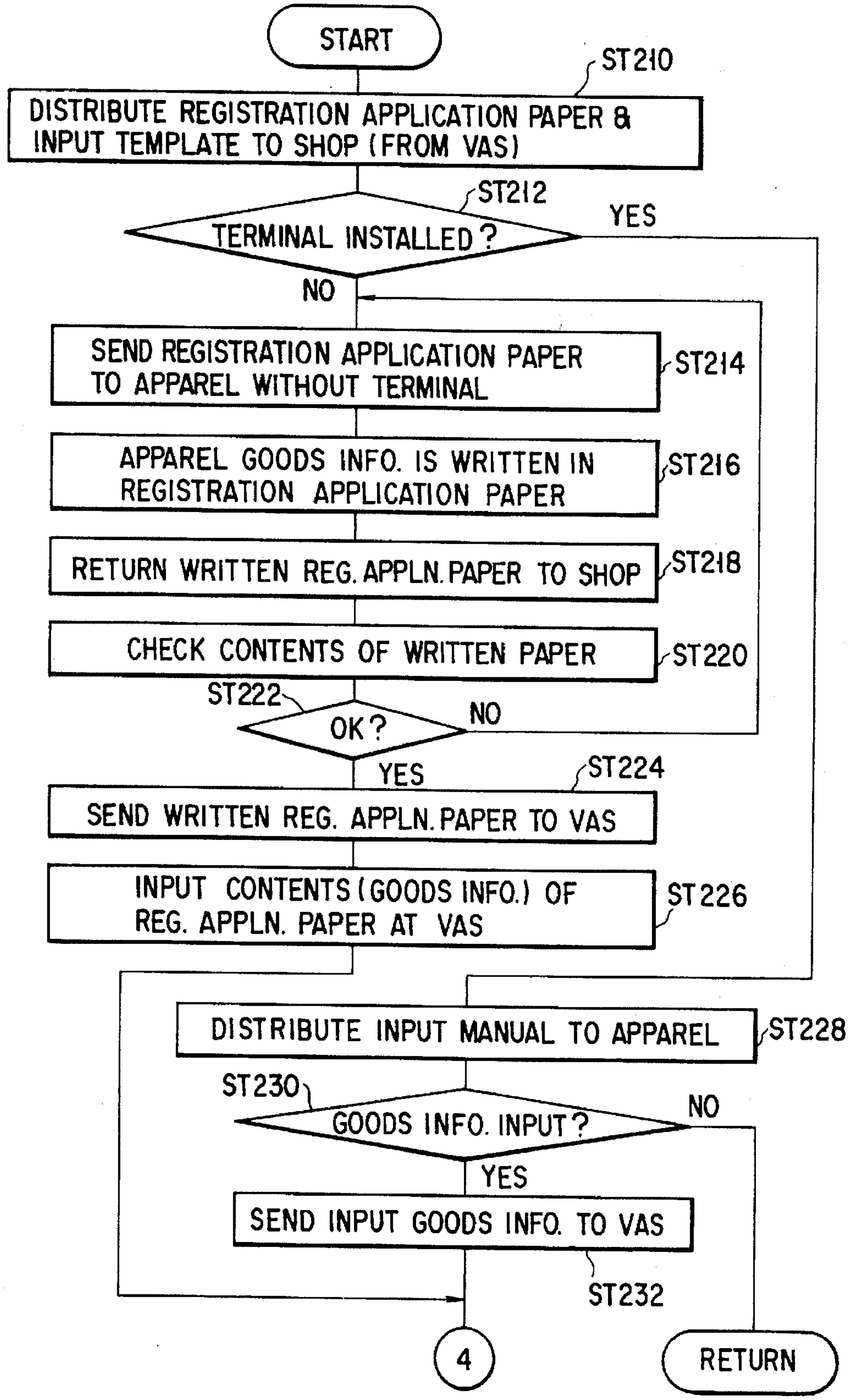
FIG. 26 is a flow chart showing a sequence when apparel goods information is registered in a VAS.

FIG. 26 is a flow chart for explaining how the apparel goods information is registered in the VAS when a retail shop as a VAS member is taken as the start point of information registration activity.

The VAS in FIG. 31 distributes a registration application paper or form having a predetermined format and an input template (step ST210).

If apparel maker 20A connected in business with the retail shop does not have a VAS terminal (NO in step ST212), shop 10K sends the registration application paper and the input template to this apparel maker (step ST214). The apparel maker writes information of its own goods in the registration application paper in accordance with the input template (step ST216) and sends it back to shop 10K (step ST218).

This registration application paper is used to register goods (clothes and associated information) of apparel maker 20A and is generally a form having predetermined items (e.g., the apparel number and VAS designated items shown in FIG. 21).

If this apparel maker has a personal computer (and image grabbing scanner), the apparel maker may input the predetermined items using software (using database software, spread sheet software, authoring software, image grabbing software, or the like running in this personal computer, as needed) capable of handling the contents corresponding to the registration application paper. In this case, the contents of the registration application paper can be recovered in a plurality of floppy disks or a magneto-optic disk (MO disk). (If image information is to be kept as a photograph or recorded in a video recorder, a magnetic floppy disk can be generally used.) The format of the information recovered in the MO disk or the like is converted to be handled by VAS software later.

The retail shop checks the written contents of the registration application paper (step ST220). If any descriptive deficiency is found, the retail shop sends a registration application paper to the apparel maker again (NO in step ST220).

If no problem is posed by the written contents (YES in step ST220), the written application paper is sent to the VAS (step ST224). If the registration application paper is actually written, the VAS must input the contents of the registration application paper to register it in the apparel DB of integration database 100 (step ST226). This input can be efficiently performed using an optical character reader (OCR) or the like.

If the registration application paper is sent in the form of an MO disk, the VAS converts the contents of the registration application paper so as to be compatible with the VAS computer (step ST226).

If the registration application paper is sent in the form of a floppy disk, a photograph, or a video image, the VAS converts the character data of the floppy disk so as to be compatible with the VAS computer, or the photograph image is read with a scanner to register it in the apparel DB of integration database 100 (step ST226). The video image is assigned with a time code and an address code and is copied to a digital VCR (or optical disk). The copied data is linked to the registered character data. When the character data is read out from the apparel DB, the video image linked to this is also read out, as needed.

If apparel maker 20A is a VAS member and has a VAS terminal (YES in step ST212), shop 10K sends an input template to the apparel maker (step ST228). This apparel maker inputs its own goods information at the terminal in accordance with the input template. If the apparel maker does not input its own apparel goods information (NO in step ST230), the apparel goods information registration process is ended, and any other processing is performed. When the apparel maker inputs the apparel goods information (YES in step ST230), the input goods information is sent to the VAS (step ST232).

Figure 27:
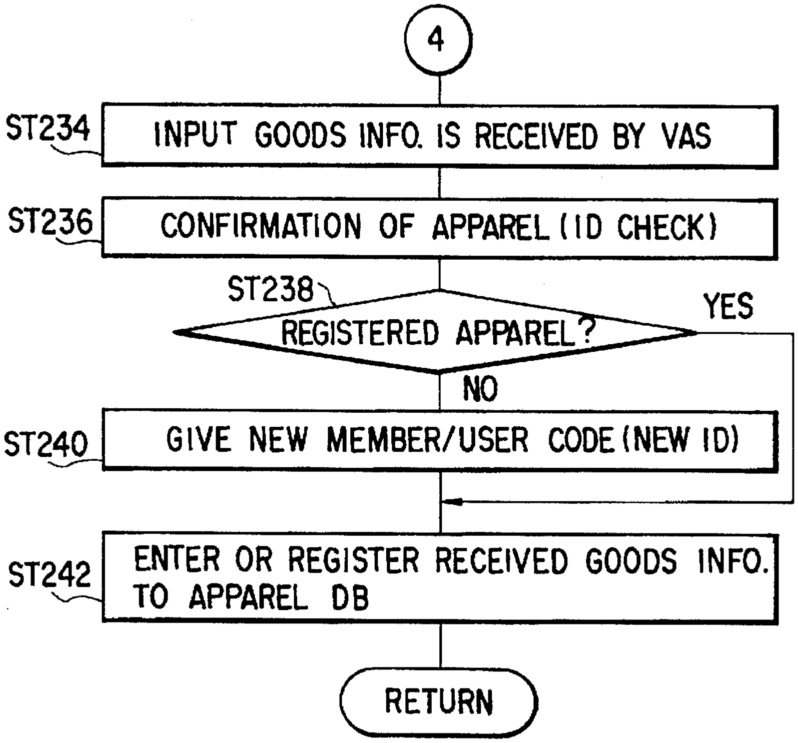
FIG. 27 is a flow chart for explaining the sequence for forming an apparel database in the VAS.

FIG. 27 is a flow chart for explaining a sequence of forming an apparel database in the VAS. When the VAS receives the input goods information (step ST234), VAS host computer 100S confirms the apparel maker from which the goods information is sent. This confirmation is performed by checking the apparel code (apparel ID) (step ST236).

If this apparel maker is not a VAS member, it is not registered in the VAS (NO in step ST238). In this case, no apparel ID is found. Host computer 100S temporarily adds a non-member apparel maker ID (new member/user code) (step ST240). Host computer 100S then registers the received goods information in the apparel DB of integration database 100 (step ST242). If this apparent maker is a VAS member (YES in step ST238), host computer 100S registers the received goods information in the apparel DB using its maker ID (step ST242). When apparel goods information registration process (apparel DB formation) is completed, host computer 100S performs any other processing.

When the apparel maker joins to the VAS service system in the near future, a regular apparel ID is assigned to this apparel maker. In this case, the registered old goods information is copied with a new maker code in an apparel maker file having the regular ID. The old goods information is deleted with the temporary maker code.

Figure 28:
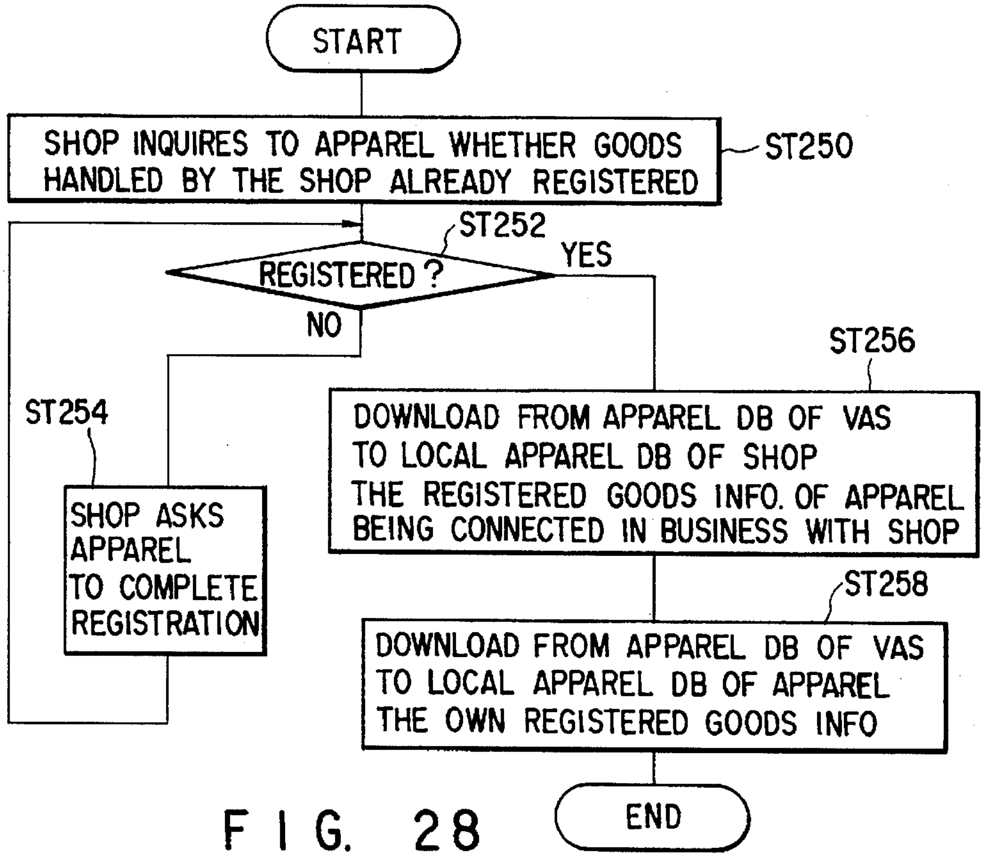
FIG. 28 is a flow chart for explaining a sequence when a retail shop and an apparel maker download desired registration goods information from the apparel database of the VAS.

FIG. 28 is a flow chart for explaining a sequence in which shop 10K and apparel maker 20A read out desired goods information from the apparel DB of integration database 100. Assume that shop 10K is a VAS member and handles the goods of three apparel makers, and that this retail shop takes an action.

Shop 10K inquires to the first apparel maker connected in business with shop 10K whether all goods of the apparel maker have already been registered. Shop 10K also inquires to the second and third apparel makers connected in business with shop 10K whether all the goods of these apparel makers have already been registered (step ST250).

If the first apparel maker has non-registered goods of all the goods (shop goods) handled by shop 10K (NO in step ST252), shop 10K asks this apparel maker to complete registration (step ST254). This registration operation is performed in accordance with the sequences described with reference to FIGS. 26 and 27.

If the non-registered goods of the first apparel maker are registered, or the goods of the second and third apparel makers are registered (YES in step ST252), shop 10K downloads the registered goods of the apparel makers (e.g., three apparel makers) connected in business with shop 10K from the apparel DB of the VAS to the local database of its own (step ST256). Although not shown, this local database is created in a hard or MO disk loaded in terminal 10T of the retail shop.

Each apparel maker downloads the goods information newly registered (or updated) to the local apparel database of its own (step ST258). Although not shown, this local database is created in a hard or MO disk loaded in the terminal of each apparel maker.

Figure 29:
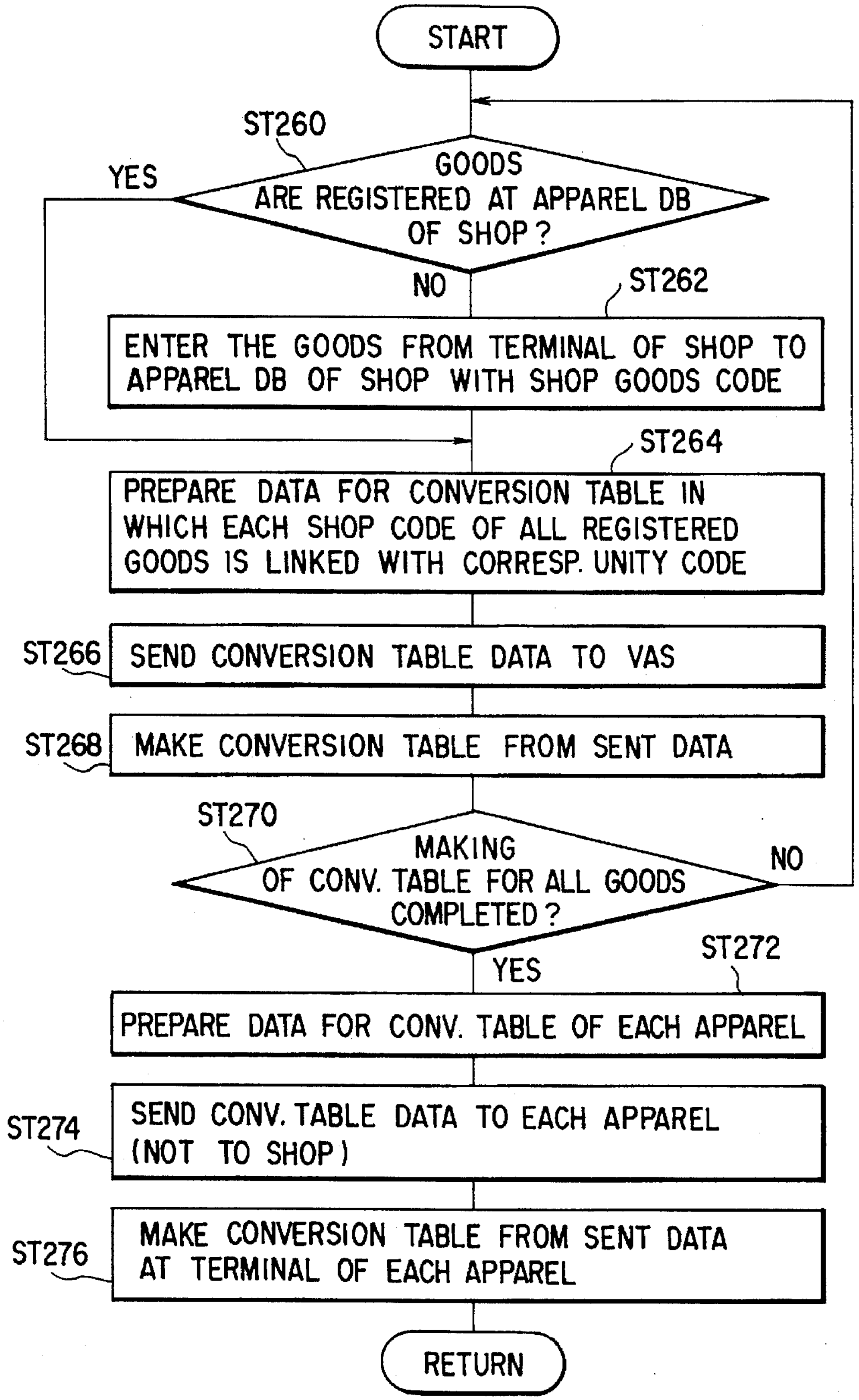
FIG. 29 is a flow chart for explaining the sequence of forming a code conversion table according to an embodiment of the present invention.

FIG. 29 is a flow chart for explaining a sequence for preparing a code conversion table of this embodiment.

Each shop 10K has the local database as described above. The local DB (apparel DB) associated with the apparel makers connected in business with shop 10K is prepared. If all the corresponding goods (goods handled by shop 10K) are not registered yet (NO in step ST260), shop 10K assigns shop goods codes to the non-registered goods at terminal 10T of shop 10K and registers them in the apparel DB (step ST262). For example, in FIG. 22C, if all the blouses represented by shop goods codes of 43151 to 43154 are already registered, and the blouse with special-order buttons represented by the shop goods code of 43154S is not registered yet, a code of 43154S is assigned to this goods to register the goods information of the blouse with the special-order buttons.

If all the goods of the retail shop are registered in the apparel DB (YES in step ST260), the shop goods codes (43151 to 43154 and 43154S) are set to correspond to the VAS unity codes (A00124305001 to A00124305004). In this case, for example, data .for the conversion table shown in FIG. 22C is prepared at terminal 10T of the retail shop (step ST264). The data for the conversion table is sent to the VAS through line 1 at an appropriate timing (e.g., at the end of business time of each day of shop 10K) (step ST266).

VAS host computer 100S makes the code conversion table (the left and right columns in FIG. 25A) using the sent data (step ST268). Note that although the code conversion table includes only the registered goods represented by shop goods codes of 43151 and 43152 of the retail shop of ID=K010, a conversion table is actually made for all the goods (43151 to 43154 and 43154S) represented by the sent data.

Preparation of the data for conversion tables is performed for all the goods of a plurality of retail shops as VAS members. That is, if goods (e.g., a blouse having a shop code ID of K020 and a goods code of B039) which is not covered by the data for the conversion table is left (NO in step ST270), data for the conversion table for this goods of the retail shop (ID=K020) is made (step ST264) and is sent to the VAS (step ST266), thereby making a conversion table (e.g., the conversion table having the contents represented in the central column of FIG. 25A) (step ST268).

Only the registered goods handled by the retail shops of ID=K010 and ID=K020 are illustrated in FIG. 25A. However, an actual code conversion table covers the data of a larger number of retail shops and the goods handled by these retail shops.

As described above, a code conversion table representing a correspondence between each registered goods (e.g., a blouse) of each apparel maker (e.g., the apparel maker of ID=A001) and each shop goods code is made (FIG. 25A). Such code conversion tables are also made for the registered goods (e.g., coats and dresses) of other apparel makers (ID=A002, A003, and the like), as shown in FIGS. 25B and 25C. A large code conversion table (i.e., a large table as the sum of the tables in FIGS. 25A to 25C) representing the correspondence between the codes of the registered goods of a plurality of apparel makers and the goods handled by a plurality of retail shops is generated as an independent file in the apparel DB in VAS integration database 100.

When the conversion table associated with all the goods (e.g., blouses, coats, and dresses) is completely made (YES in step ST270), the table data are rearranged using the apparel IDs as keywords to prepare data for the conversion table of each apparel maker (step ST272). Data for the conversion table of each apparel maker is sent to each apparel maker having the corresponding ID (step ST274). For example, data shown in FIG. 25A is sent to the apparel maker of ID=A001, and data shown in FIG. 25B is sent to the apparel maker of ID=A002.

To maintain business confidentiality of each apparel maker as a VAS member, these data for the conversion tables of the respective apparel makers are not sent to retail shops. In this case, however, it is possible to rearrange the table data using a shop ID as a keyword and send the data of the conversion table for each shop to the corresponding retail shop.

When the data of the conversion table for each apparel maker is received by the corresponding apparel maker (e.g., a maker of ID=A001), an apparel code conversion table (e.g., the contents of FIG. 25A) is made at the terminal of this apparel maker (step ST276). Each apparel maker looks up this conversion table to use an apparel code (apparel number) or a VAS unity code to access integration database 100.

For example, when apparel maker 20A of ID=A001 wants to access VAS registered goods at the apparel management level, its own apparel number (10301) is entered at the terminal to access the VAS. In this case, with reference to the apparel code conversion table, the apparel number (10301) is converted into the corresponding unity code (A0012430500*; * represents 1, 2, 3, or 4 in the normal expression). By this unity code, the apparel maker can read out registered data (FIG. 22A) of its own goods, e.g., blouses from the apparel DB in integration database 100 without distinguishing color variations/size variations/other information.

When apparel maker 20A of ID=A001 wants to access registered goods in the VAS management level, apparel maker 20A can use the unity codes (A00124305001 to A00124305004) to access the VAS. In this case, one or more items (color and other information) of the color variations, size variations, and other information can be distinguished to read out its own apparel goods information (blouses) from the apparel DB in integration database 100.

Figure 30:
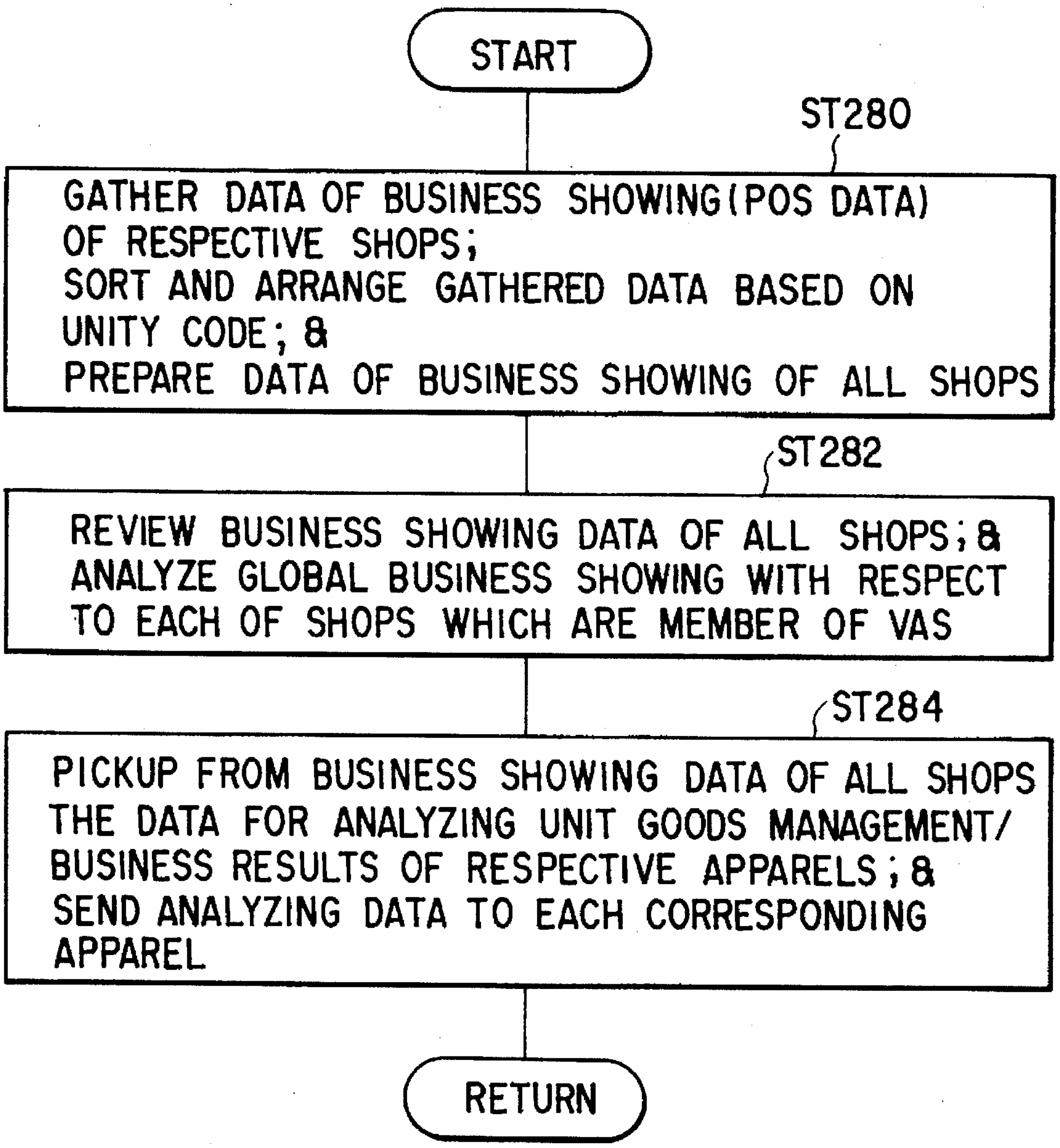
FIG. 30 is a flow chart for explaining the sequence for analyzing data of business showing.

FIG. 30 is a flow chart for explaining a business showing analysis process.

Each shop 10K has terminal 10T having the POS function, as shown in FIG. 31. Data of the amount of sold of each shop 10K is recorded at terminal 10T in real time, and the recorded data of the amount of sold is sequentially sent to the VAS through line 1. These data of the amounts of sold are classified by the shop goods codes of the respective shops. VAS host computer 100S looks up the code conversion tables shown in FIGS. 25A to 25C to sort and arrange the data of the amounts of sold on the basis of the unity codes.

More specifically, host computer 100S sorts and arrange the data of the amounts of sold on the basis of the unity codes, and business showing data of all the shops as VAS members are prepared for each goods (step ST280). This data represents the shop business showing of the goods in the global apparel business world. This data in the global apparel business world is sorted and arranged using a unity code and an apparel maker ID as a keyword. The business showing of each apparel maker as a VAS member (a specific apparel maker or any other apparel maker) in the global apparel business world can be analyzed (step ST282).

As described above, when data of each apparel maker is sorted and arranged using the classification of goods having a unity code (xxx24305xxx for a blouse, as shown in FIG. 25A) or the apparel number (10301 for blouse) as a keyword, management data of unit goods for each apparel maker can be obtained. If data for each apparel maker is sorted and arranged using a shop ID code (e.g., K010 or K020 in FIG. 25A) as a keyword, management data of unit goods for each customer (retail shop) can be obtained. If the data is sorted and arranged using a shop ID code as a keyword without depending on the classification of goods, business showing data of each apparel maker for each customer (retail shop) can be obtained.

As described above, when unit goods management/apparel business showing data of each apparel maker is extracted from the shop business showing data of the global apparel business world, each extracted data is sent to each apparel maker having the corresponding ID (step ST284).

Figure 32:
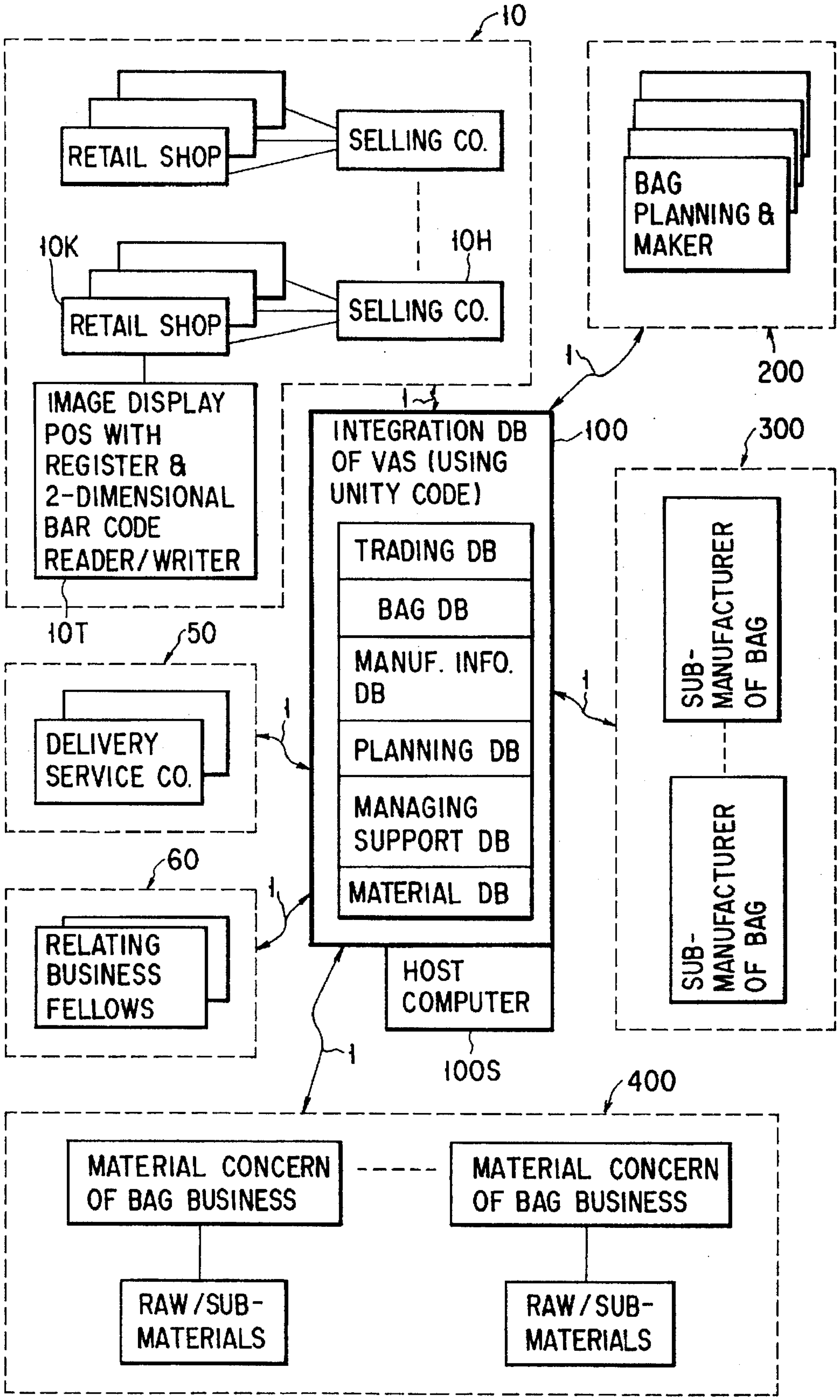
FIG. 32 is a block diagram showing an overall arrangement of a bag business-associated information service system which employs the code conversion system of the present invention.

FIG. 32 is a block diagram showing the overall arrangement when the code conversion system is applied to an information service system to a business world or an industry (e.g., an industry of bags) other than the apparel business world. Referring to FIG. 32, integration database 100 processed with unity codes is managed by VAS host computer 100S. Various concerns engaged with the industry of bags Joint to the VAS. These concerns use their own terminals leased from the VAS to access VAS database 100, as needed.

Integration database 100 is connected to selling company group 10, bag planning & maker group 200, group 300 of sub manufacturers of bags, group 400 of material concerns of bag business, delivery service company group 50, related business fellow group 60 through line 1. Database 100 is the common database for the above member groups.

Selling company group 10 is a group of a plurality of independent selling companies 10H and a plurality of independent retail shops 10K. These companies and shops run business using their own shop goods codes. Each shop 10K has terminal 10T for performing communication with database 100. Terminal 10T of shop 10K has a basic function of accessing integration database 100 to receive each information service from the VAS and also has a POS function, a register function, a one- or two-dimensional bar code reading/writing function so as to directly receive shop business showing information. This terminal 10T has a bit map image display apparatus and can appropriately use the POS function, the register function, and the bar code processing function while the operator observes image information of handled goods.

Bag planning & maker group 200 is a group of a plurality of independent bag planning & makers. These makers run business using the their own bag goods codes. Each bag planning & maker has an image display terminal (not shown) similar to that of shop 10K.

Group 300 of sub manufacturers of bags is a group of a plurality of independent sub manufacturers of bags which run business. Although not shown, each sub manufacturer of bags also has an image display terminal.

Material concern group 400 is a group of bag material business concerns and row material/sub-material manufacturing concerns. Group 400 may be specialized concerns or a single enterprise. Although not shown, each material business concern also has an image display terminal.

Delivery service group 50 is constituted by one or more delivery service companies for transporting goods or materials between groups 10, 200, 300, and 400. Relating business fellow group 60 includes business consultants, accountants, advertizing companies, goods planners, trend watchers, and the like.

Integration database 100 comprises a trading DB for storing trading conditions between consumers and retail shops, between members 10, 200, 300, and 400 and business showing information, a bag DB for storing various kinds of information of new and old goods manufactured by each bag planning & maker, a manufacturing information (manuf. info.) DB for storing manufacturing associated information representing the steps from the order of materials to the manufacture, a planning information DB for storing information associated with planning of a new goods to be sold, a management support DB for sorting management support information of members 10, 200 to 400, 50, and 60, and a material DB for storing material information such as skin materials used for the goods.

In the arrangement shown in FIG. 32, code conversion between each bag planning & maker and integration database 100 and code conversion between each shop and integration database 100 are performed in the same manner as described above with reference to the apparel business world.

In the code conversion system of the second invention, a difference between the code system (unity code system) of an information service system and the code system of the system member (each apparel maker or each retail shop) can be absorbed, so that a network effective for different types of enterprises having different management systems can be created. In addition, a hierarchical system can be created between the management systems of the different types of enterprises. (In this case, a unity code system is assumed to be present in the route directory of this hierarchical system.)

In the code conversion system of the second invention, a difference between the code system (unity code system) of the information service system and the code system of the system member (each apparel maker or each retail shop) can be absorbed or cancelled, so that the management level of each member can be independently and freely changed without damaging the unity code system.

In the above description, code conversion in the information service systems in the apparel business world and the industry of bags are assumed. However, the present invention is not limited to these information service systems, but can be applied to other information service systems in other industries such as industries of electronic parts, mail orders, and cameras.

When the code conversion system of the second invention is employed, a difference between the code systems of the information service system and each system member can be absorbed or cancelled. For this reason, each member of the information service system having a unique unity code system can use its own code to access the information service system so as to manage the goods and at the same time can use a unity code to gather and process the information of all the members including information of other members.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information service system for offering an information service to a plurality of system members, comprising:

a database for storing goods information obtained from one system member together with a unity code corresponding to a member's code used by said one system member for specifying the goods information;

means for linking, to the unity code, a member's code used by another system member for specifying goods which is equivalent to the goods specified by the goods information corresponding to the unity code;

first obtaining means for obtaining business information with respect to particular goods of one or more system members using the unity code which corresponds to the particular goods;

second obtaining means for obtaining specific business information with respect to particular goods of a specific system member using the system member's code which corresponds to the particular goods; and means for responding to a request of said one system member or of said another system member so as to access said database using the unity code when said one system member or said another system member does not use the member's code to access the goods information in said database.

2. A system according to claim 1, further comprising:

means for preparing a conversion table which links the member's code of respective goods with a corresponding unity code, said conversion table being hidden from the system members.

3. A code conversion system applied to an information service system, having at least one member who manages information or goods using an original code system, for supervising the information of goods handled by the member, said code conversion system comprising:

means for modifying a member code of the original code system to provide a unity code in a predetermined code system of said information service system, the unity code being obtained in order to supervise the information or goods managed by the member in said information service system;

wherein original code systems of respective system members can assign different member codes to same information or goods corresponding to the unity code;

means for storing code conversion information representing a correspondence between the unity code and the member code with respect to the same information or goods;

means for converting a code for managing the same information or goods between the member code and the unity code; and means for obtaining business information with respect to particular goods of one or more system members using the unity code which corresponds to the particular goods.

4. A system according to claim 3, wherein the member code has a given management level, the unity code has a prescribed management level, and the unity code includes a code for specifying the member, a code corresponding to the member code, and a code corresponding to the information or goods specified by the member code, and wherein the given management level of the member code does not distinguish variations in the information or goods specified by the member code while the prescribed management level of the unity code distinguishes the variations in the information or goods specified by the member code.

5. A code conversion system applied to an information service system, having a first group including at least one member who manages information or goods using a first group member code obtained by a first original code system and a second group including at least one member who manages information or goods using a second group member code obtained by a second original code system, for supervising the information and goods handled by said first and second groups, said code conversion system comprising:

means for modifying the first group member code to provide a unity code in a predetermined code system of said information service system, the unity code being obtained to supervise the information or goods managed by each member of said first group in said information service system;

wherein original code systems of respective system members can assign different member codes to same information or goods corresponding to the unity code;

means for storing first code conversion information representing a correspondence between the unity code and the first group member code of the same information or goods, and second code conversion information representing a correspondence between the unity code and the second group member code of the same information or goods;

means for converting a code of the same information or goods between the first group member code, the second group member code, and the unity code, using the first or second code conversion information; and means for obtaining business information with respect to particular goods of one or more system members using the unity code which corresponds to the particular goods.

6. A system according to claim 5, wherein the first group member code has a given management level, the unity code has a prescribed management level, and the unity code includes a code for specifying the first group member, a code corresponding to the first group member code, and a code corresponding to the information or goods specified by the first group member code, and wherein the given management level of the first group member code does not distinguish variations in the information or goods specified by the first group member code while the prescribed management level of the unity code distinguishes the variations in the information or goods specified by the first group member code.

7. A system according to claim 6, wherein the first code conversion information includes the unity code and the first group member code and defines a correspondence between a number of variations distinguished by the management level of the first group member code and a number of variations distinguished by the management level of the unity code.

8. A system according to claim 6, wherein the second code conversion information includes the unity code and the second group member code and defines a correspondence between a number of variations distinguished by the management level of the second group member code and a number of variations distinguished by the management level of the unity code.

9. An information management system using a unity code system, comprising:

a first group of system members including at least one member who manages goods including information by a first code system;

a second group of system members including at least one member who manages goods by a second code system;

means for supervising the goods by the unity code system;

means for storing code system association information for associating the first code system, the unity code system, and the second code system;

first modifying means for modifying a first original code of the first code system assigned to same goods to a first unity code including a portion which is common to the same goods;

second modifying means for modifying a second original code of the second code system assigned to other of same type of goods to a second unity code including a portion which is common to the other of the same type of goods; and means for obtaining business information with respect to particular goods of one or more system members using the first or second unity code which corresponds to the particular goods.

10. A system according to claim 9, wherein said storing means includes a predetermined file containing the code system association information.

11. A system according to claim 10, wherein said predetermined file includes a unity code which includes first information for specifying the member of the first group, second information used to cause the member of the first group to specify the goods, and third information used by said supervising means for the goods specified by the second information.

12. A system according to claim 10, wherein said predetermined file further includes fourth information for causing the member of the second group to specify the goods.

13. An information service method, adopting at least one system member who manages information or goods using an original code system, for supervising the information or goods handled by the at least one system member, comprising:

using a corrected member code as a unity code in a predetermined code system of said information service system, the unity code being obtained in order to supervise the information or goods managed by the at least one system member in said information service system;

wherein the original code system of respective system members can assign different member codes to same information or goods;

storing code conversion information representing a correspondence between the unity code and the member code with respect to the same information or goods;

converting a code for managing the same information or goods between the member code and the unity code; and obtaining business showing with respect to particular goods of one or more different members using the unity code which corresponds to the particular goods.

14. An information service system for offering an information service to a plurality of system members, comprising:

a database for storing goods information obtained from one system member together with a unity code corresponding to a member's code used by said one system member for specifying the goods information;

means for linking, to the unity code, a member's code used by another system member for specifying goods which is equivalent to the goods specified by the goods information;

means for obtaining business information with respect to particular goods of one or more system members corresponding to the unity code using the unity code which corresponds to the particular goods; and means for responding to a request of said one system member or of said another system member so as to access said database using the unity code when said one system member or said another system member does not use the member's code to access the goods information in said database.

15. A system according to claim 14, further comprising:

means for preparing a conversion table which links the member's code of respective goods with a corresponding unity code, said conversion table being hidden from the system members.

16. An information service system for offering an information service to a plurality of system members, comprising:

a database for storing goods information obtained from one system member together with a unity code corresponding to a member's code used by said one system member for specifying the goods information;

means for linking, to the unity code, a member's code used by another system member for specifying goods which is equivalent to the goods specified by the goods information;

means for obtaining specific business information with respect to particular goods of a specific system member corresponding to the unity code, using the member's code with corresponds to the particular goods; and means for responding to a request of said one system member or of said another system member so as to access said database using the unity code when said one system member or said another system member does not use the member's code to access the goods information in said database.

17. A system according to claim 16, further comprising:

means for preparing a conversion table which links the member's code of respective goods with a corresponding unity code, said conversion table being hidden from the system members.

18. A code conversion system applied to an information service system, having at least one member who manages information or goods using an original code system, for supervising the information of goods handled by the member, said code conversion system comprising:

means for modifying a member code of the original code system to provide a unity code in a predetermined code system of said information service system, the unity code being obtained in order to supervise the information or goods managed by the member in said information service system;

wherein original code systems of respective system members can assign different member codes to same information or goods corresponding to the unity code;

means for storing code conversion information representing a correspondence between the unity code and the member code with respect to the same information or goods;

means for converting a code for managing the same information or goods between the member code and the unity code; and means for obtaining specific business information with respect to particular goods of a specific system member using the member's code which corresponds to the particular goods.

19. A system according to claim 18, wherein the member code has a given management level, the unity code has a prescribed management level, and the unity code includes a code for specifying the member, a code corresponding to the member code, and a code corresponding to the information or goods specified by the member code, and wherein the given management level of the member code does not distinguish variations in the information or goods specified by the member code while the prescribed management level of the unity code distinguishes the variations in the information or goods specified by the member code.

20. A code conversion system applied to an information service system, having a first group including at least one member who manages information or goods using a first group member code obtained by a first original code system and a second group including at least one member who manages information or goods using a second group member code obtained by a second original code system, for supervising the information and goods handled by said first and second groups, said code conversion system comprising:

means for modifying the first group member code to provide a unity code in a predetermined code system of said information service system, the unity code being obtained to supervise the information or goods managed by each member of said first group in said information service system;

wherein original code systems of respective system members assigns different member codes to same information or goods;

means for storing first code conversion information representing a correspondence between the unity code and the first group member code of the same information or goods, and second code conversion information representing a correspondence between the unity code and the second group member code of the same information or goods;

means for converting a code of the same information or goods between the first group member code, the second group member code, and the unity code, using the first or second code conversion information; and means for obtaining specific business information with respect to particular goods of a specific system member using the first or second group member code which corresponds to the particular goods.

21. A system according to claim 20, wherein the first group member code has a given management level, the unity code has a prescribed management level, and the unity code includes a code for specifying the first group member, a code corresponding to the first group member code, and a code corresponding to the information or goods specified by the first group member code, and wherein the given management level of the first group member code does not distinguish variations in the information or goods specified by the first group member code while the prescribed management level of the unity code distinguishes the variations in the information or goods specified by the first group member code.

22. A system according t0 claim 21, wherein the first code conversion information include the unity code and the first group member code and defines a correspondence between a number of variations distinguished by the management level of the first group member code and a number of variations distinguished by the management level of the unity code.

23. A system according to claim 21, wherein the second code conversion information includes the unity code and the second group member code and defines a correspondence between a number of variations distinguished by the management level of the second group member code and a number of variations distinguished by the management level of the unity code.

24. An information management system using a unity code system, comprising:

a first group of system members including at least one member who manages goods including information by a first code system;

a second group of system members including at least one member who manages goods by a second code system;

means for supervising the goods by the unity code system;

means for storing code system association information for associating the first code system, the unity code system, and the second code system, first modifying means for modifying a first original code of the first code system assigned to same goods to a first unity code including a portion which is common to the same goods;

second modifying means for modifying a second original code of the second code system assigned to other of same type of goods to a second unity code including a portion which is common to the other of the same type of goods; and means for obtaining specific business information with respect to particular goods of a specific member using the first or second original code which corresponds to the particular goods.

25. A system according to claim 24, wherein said storing means includes a predetermined file containing the code system association information.

26. A system according to claim 25, wherein said predetermined file includes a unity code which includes first information for specifying the member of the first group, second information used to cause the member of the first group to specify the goods, and third information used by said supervising means for the goods specified by the second information.

27. A system according to claim 25, wherein said predetermined file further includes fourth information for causing the member of the second group to specify the goods.

28. An information service method, adopting at least one system member who manages information or goods using an original code system, for supervising the information or goods handled by the at least one system member, comprising:

using a corrected member code as a unity code in a predetermined code system of said information service system, the unity code being obtained in order to supervise the information or goods managed by the at least one system member in said information service system;

wherein the original code system of respective system members assigns different member codes to same information or goods;

storing code conversion information representing a correspondence between the unity code and the member code with respect to the same information or goods;

converting a code for managing the same information or goods between the member code and the unity code; and obtaining specific business information with respect to particular goods of a specific system member using the member code which corresponds to the particular goods.

* * * * *